US012269452B2

(12) United States Patent
Hokuto et al.

(10) Patent No.: US 12,269,452 B2
(45) Date of Patent: *Apr. 8, 2025

(54) PEDAL DEVICE

(71) Applicant: DENSO CORPORATION, Kariya (JP)

(72) Inventors: Daisuke Hokuto, Kariya (JP); Etsugo Yanagida, Kariya (JP); Masashi Arao, Kariya (JP); Kengo Ito, Kariya (JP); Yasuhisa Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,775

(22) Filed: Nov. 2, 2023

(65) Prior Publication Data

US 2024/0059261 A1 Feb. 22, 2024

Related U.S. Application Data

(63) Continuation of application No. PCT/JP2022/013790, filed on Mar. 24, 2022.

(30) Foreign Application Priority Data

May 14, 2021 (JP) ................................ 2021-082791

(51) Int. Cl.
*B60T 8/17* (2006.01)
*G05G 1/38* (2008.04)
*G05G 5/03* (2008.04)

(52) U.S. Cl.
CPC .................. *B60T 8/17* (2013.01); *G05G 1/38* (2013.01); *G05G 5/03* (2013.01)

(58) Field of Classification Search
CPC .... B60T 8/17; B60T 7/06; G05G 1/38; G05G 5/03; G05G 1/30; G05G 1/44
See application file for complete search history.

(56) References Cited

U.S. PATENT DOCUMENTS

| | | | | |
|---|---|---|---|---|
| 10,946,741 | B1 * | 3/2021 | Kim | ...................... B60T 7/06 |
| 2007/0157755 | A1 * | 7/2007 | Kim | ...................... G05G 5/03 |
| | | | | 74/513 |

(Continued)

FOREIGN PATENT DOCUMENTS

DE 102009032664 B4 * 5/2016 ............. B60K 26/02

OTHER PUBLICATIONS

Written Opinion of the International Searching Authority of International Appl. No. PCT/JP2022/013790, May 17, 2022 (Year: 2022).*

(Continued)

*Primary Examiner* — Vinh Luong

(74) *Attorney, Agent, or Firm* — Nixon & Vanderhye P.C.

(57) ABSTRACT

A pedal pad in an organ-type pedal device swings about a predetermined axis when stepped on by a driver's foot. A sensor unit outputs a signal corresponding to a swing angle of the pedal pad. A reaction force generation mechanism has an elastic member that generates a reaction force against a driver's pedaling force applied to the pedal pad. A first housing covers the reaction force generation mechanism, and an opening at least on one side. A second housing is provided on one side of the first housing in a swing direction of the pedal pad. Further, the first housing has a largest opening on a second housing side, which is closed by the second housing and into which the elastic member of the reaction force generation mechanism in a non-bending state is insertable.

16 Claims, 25 Drawing Sheets

(56) References Cited

U.S. PATENT DOCUMENTS

| | | |
|---|---|---|
| 2021/0370769 A1 | 12/2021 | Kita et al. |
| 2023/0393606 A1* | 12/2023 | Fukuda .................... G05G 1/44 |
| 2024/0059262 A1* | 2/2024 | Hokuto .................... B60T 8/17 |

OTHER PUBLICATIONS

Machine translation of DE-102009032664-B4, Heinrich, May 12, 2016 (Year: 2016).*

U.S. Appl. No. 18/500,944 to Masashi Arao, filed Nov. 2, 2023 (94 pages).

U.S. Appl. No. 18/500,853 to Yasuhisa Fukuda et al., filed Nov. 2, 2023 (117 pages).

U.S. Appl. No. 18/501,607 to Daisuke Hokuto et al., filed Nov. 3, 2023 (75 pages).

U.S. Appl. No. 18/501,718 to Yasuhisa Fukuda, filed Nov. 3, 2023 (58 pages).

U.S. Appl. No. 18/500,599 to Kengo Ito et al., filed Nov. 2, 2023 (49 pages).

U.S. Appl. No. 18/500,573 to Kengo Ito et al., filed Nov. 2, 2023 (51 pages).

U.S. Appl. No. 18/500,962 to Atsushi Nishimura et al., filed Nov. 2, 2023 (43 pages).

\* cited by examiner

PEDAL DEVICE

CROSS REFERENCE TO RELATED APPLICATION

The present application is a continuation application of International Patent Application No. PCT/JP2022/013790 filed on Mar. 24, 2022, which designated the U.S. and claims the benefit of priority from Japanese Patent Application No. 2021-082791 filed on May 14, 2021. The entire disclosures of all of the above applications are incorporated herein by reference.

TECHNICAL FIELD

The present disclosure relates to a pedal device to be mounted on a vehicle.

BACKGROUND

Conventionally, there has been known an organ-type pedal device in which a portion of a pedal pad stepped on by a driver is arranged above a swing axis of the pedal device in the vertical direction when the pedal device is mounted on a vehicle.

SUMMARY

According to one aspect of the present disclosure, an organ-type pedal device is configured to transmit an electric signal corresponding to a pedal operation amount by a driver to an electronic control device of a vehicle. The pedal device includes a pedal pad, a sensor unit, a reaction force generation mechanism, a first housing and a second housing. The pedal pad is configured to swing about a predetermined axis when the pedal pad is stepped on by a driver's foot. Further, a step portion of the pedal pad stepped on by the driver is arranged above the axis in the vertical direction when the pedal device is mounted on the vehicle. The sensor unit is configured to output a signal corresponding to a swing angle of the pedal pad. The reaction force generation mechanism has an elastic member that generates a reaction force against the driver's pedaling force applied to the pedal pad. The first housing is configured to cover the reaction force generation mechanism, and to have an opening at least on one side. The second housing is provided on one side in a swing direction of the pedal pad. The first housing is provided with, on one side where the second housing is provided, a largest opening into which the elastic member in a non-bending state is insertable, and the largest opening is closed by the second housing.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
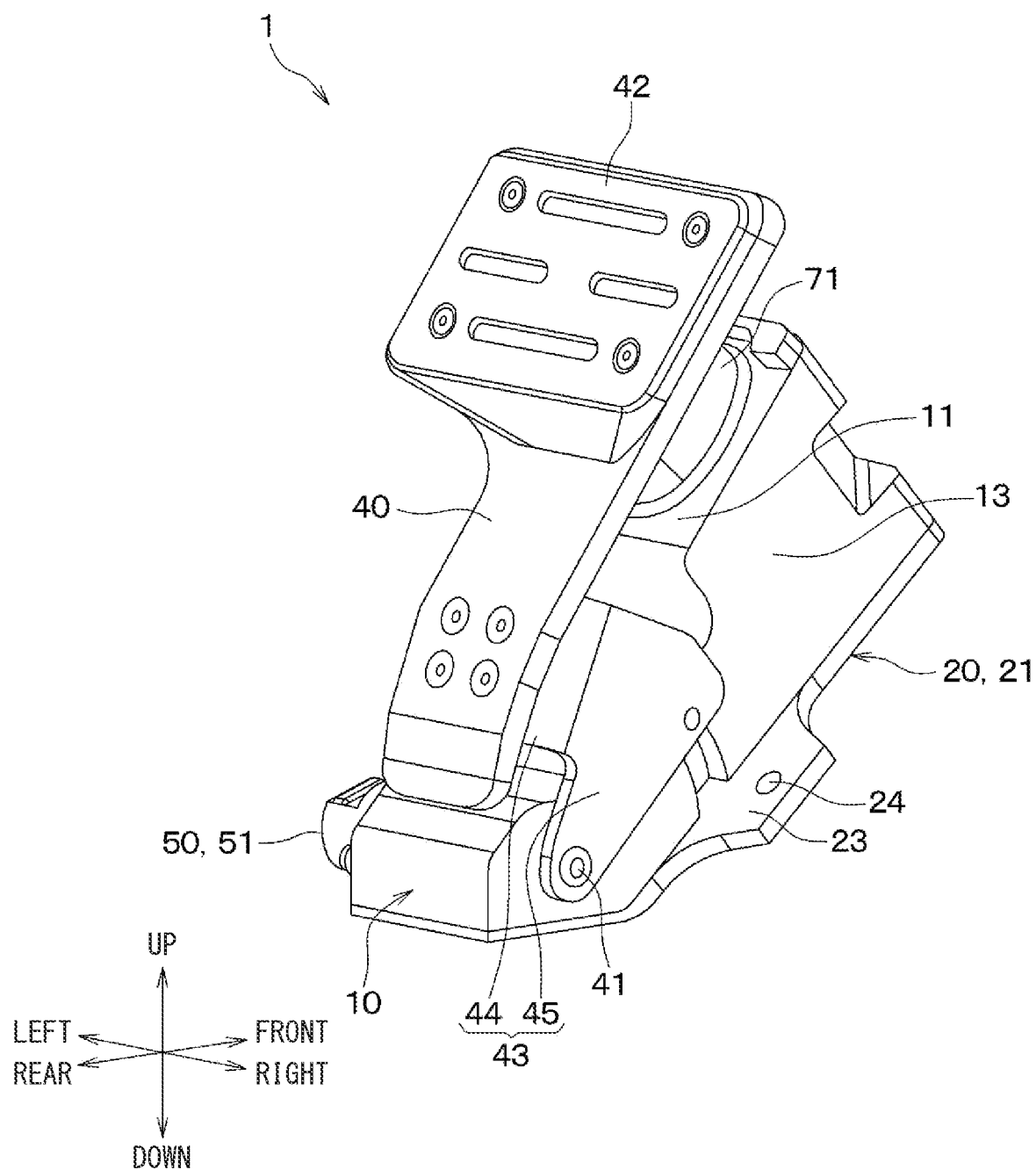
FIG. 1 is a perspective view of a pedal device according to a first embodiment.
Figure 2:
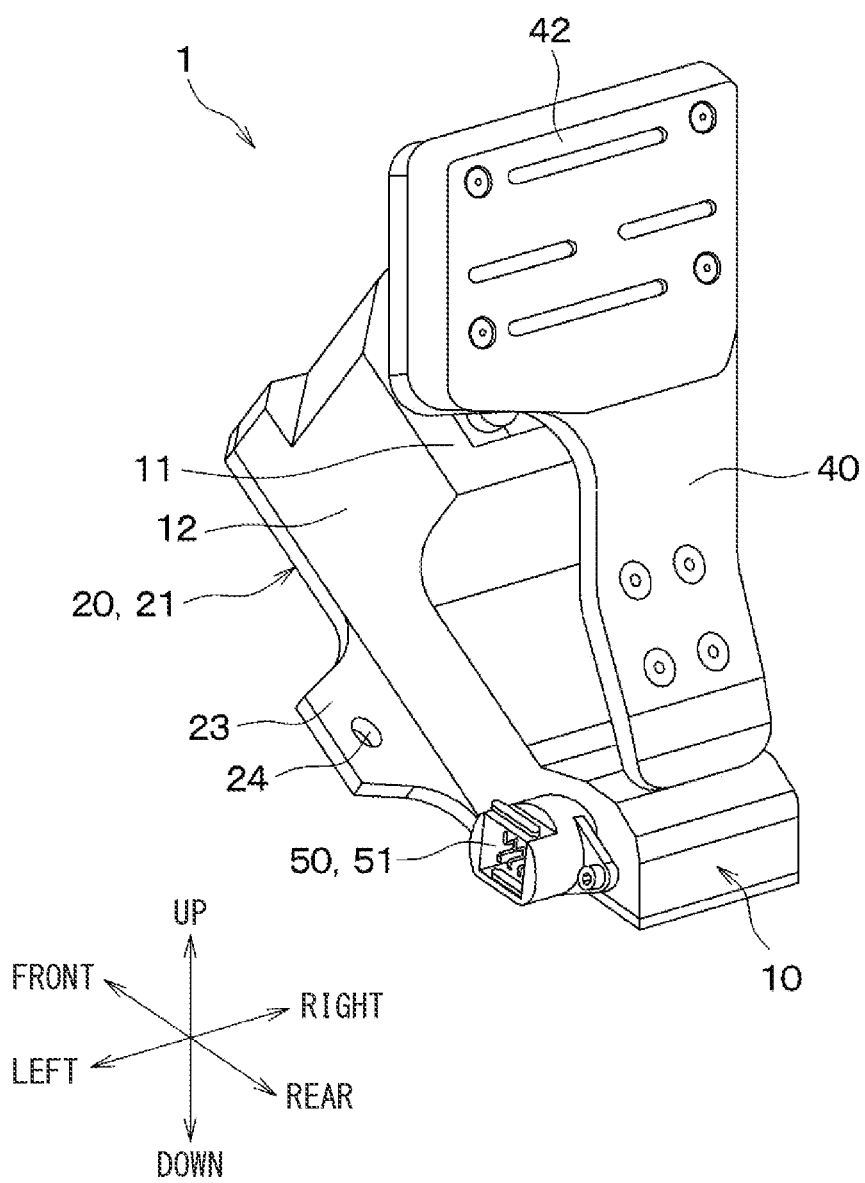
FIG. 2 is a perspective view of the pedal device according to the first embodiment when being viewed from a direction different from that of FIG. 1.
Figure 3:
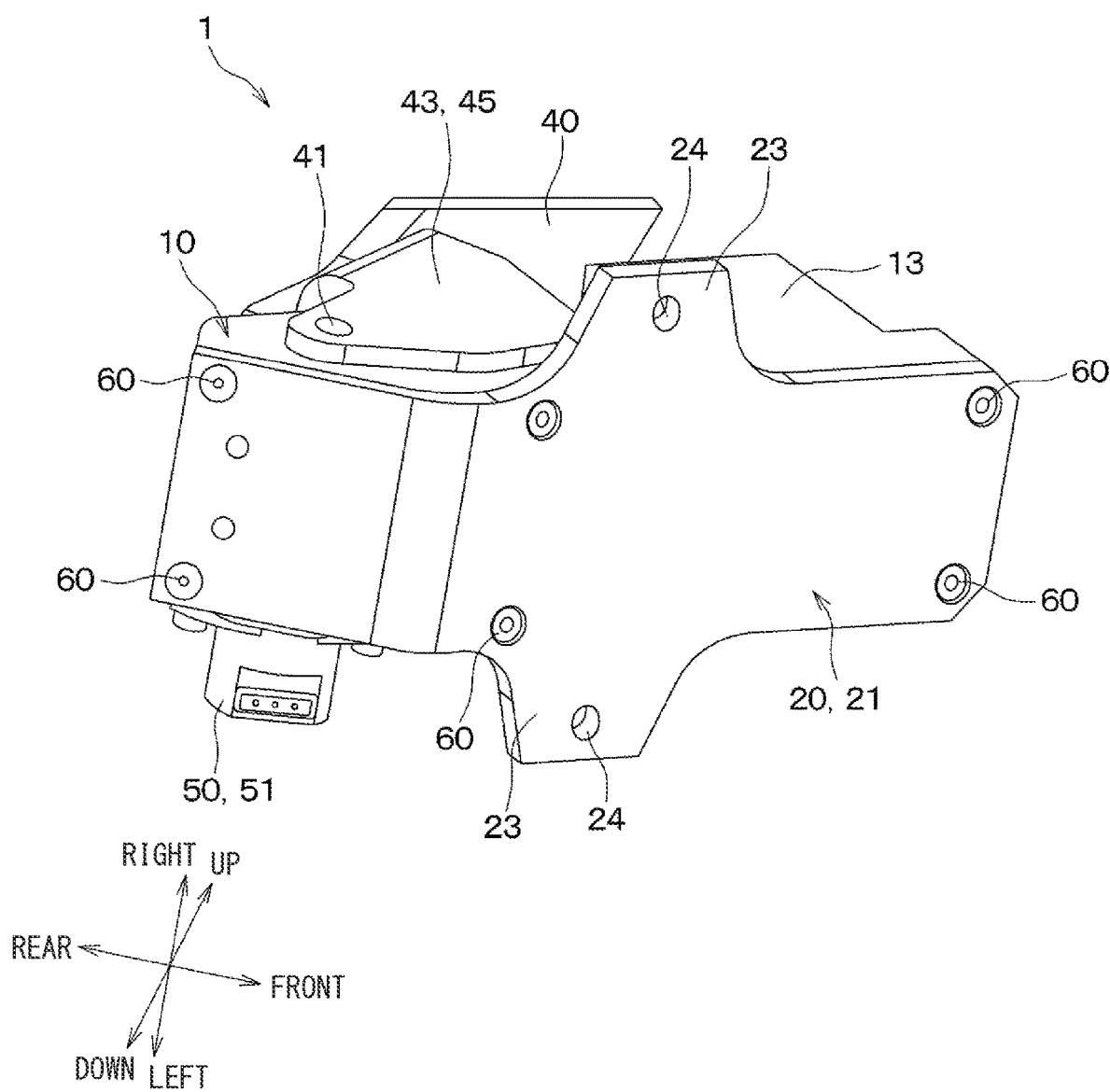
FIG. 3 is a perspective view of the pedal device according to the first embodiment, when being viewed from a second housing side.
Figure 4:
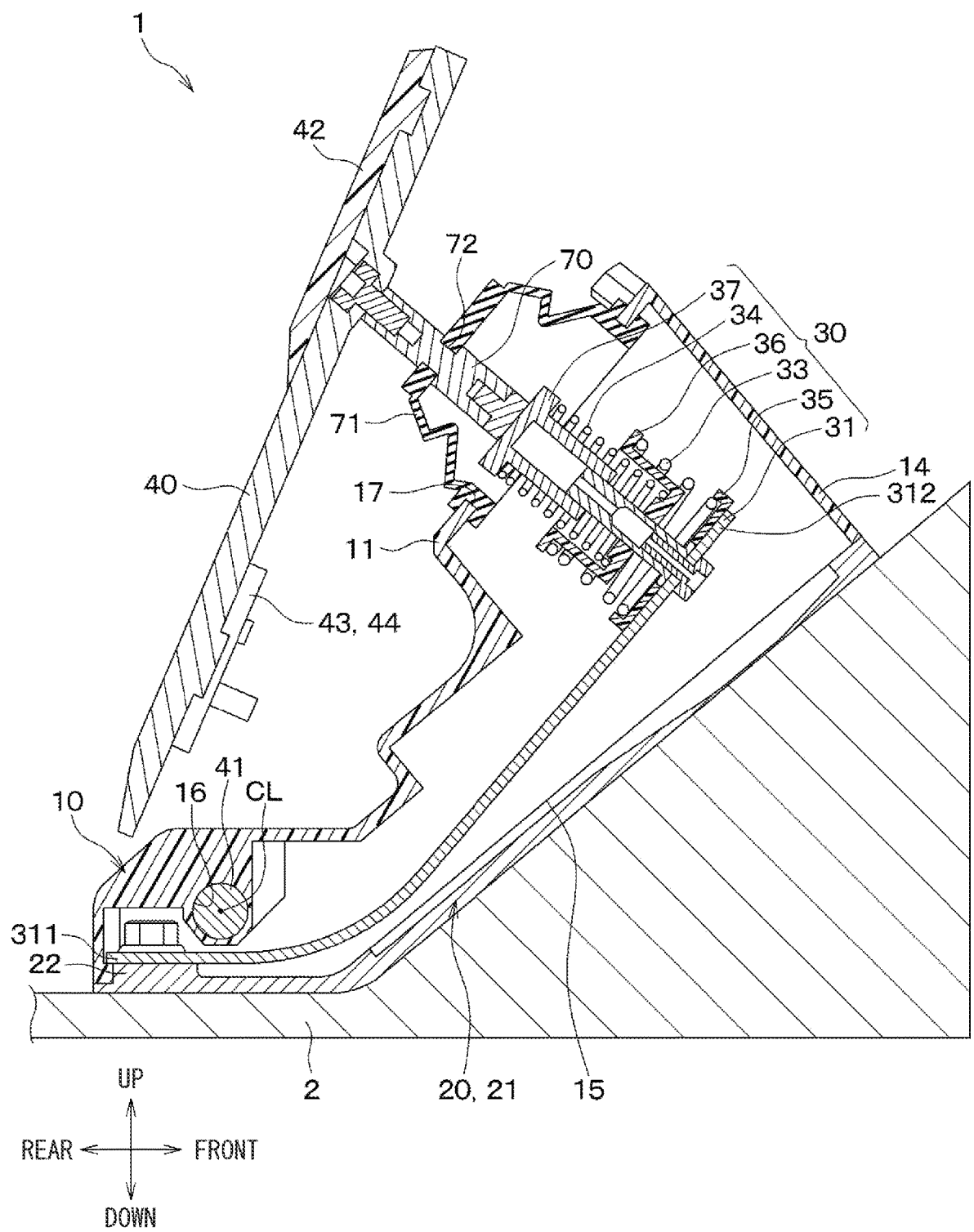
FIG. 4 is a cross-sectional view along a virtual plane perpendicular to a pivot axis of a pedal pad in the pedal device according to the first embodiment.

An organ-type pedal device may be used as an accelerator pedal device, a brake pedal device, or the like. In the pedal device, a coil spring is provided inside a housing as a reaction force generation mechanism for generating a reaction force against a driver's pedaling force applied to the pedal pad. A portion of the coil spring opposite to the pedal pad is supported by an inner wall of the housing. A coil spring is installed inside a housing in a compressed state having a shorter length with respect to a natural length (i.e., in a bent state).

In the manufacturing process of the pedal device, it is conceivable to install the coil spring inside the housing while holding the coil spring in a bent state using a jig or the like.

In general, a coil spring used in a brake pedal device has a greater elastic force than a coil spring used in an accelerator pedal device. Therefore, when the above-described manufacturing method is applied to the brake pedal device, the jig for bending and holding the coil spring with a large load becomes large, which may deteriorate the assemblability.

It is an object of the present disclosure to provide a pedal device having an improved assemblability.

According to an exemplar of the present disclosure, an elastic member of a reaction force generation mechanism in a non-bending state is arranged and assembled at a position between a first housing and a second housing from a largest opening. Therefore, when the reaction force generation mechanism is assembled at a position between the first housing and the second housing, there is no need to provide a jig that bends the reaction force generation mechanism. Thus, in such pedal device, the components are easily assembled, and the pedal device has an improved assemblability.

Embodiments of the present disclosure will now be described with reference to the drawings. Parts that are identical or equivalent to each other in the following embodiments are assigned the same reference numerals and will not be repeatedly described.

First Embodiment

The first embodiment is described with reference to FIGS. 1 to 5. A pedal device 1 of the present embodiment is an organ-type pedal device that is mounted on a vehicle and that is stepped on by a driver's pedaling force. The organ-type pedal device 1 refers to a structure in which a portion of a pedal pad 40 that is stepped on by the driver is arranged above a swing axis CL in the vertical direction when mounted on the vehicle. The three-dimensional coordinates shown in FIGS. 1 to 4 indicate an up-down direction, a front-rear direction, and a left-right direction when the pedal device 1 is mounted on the vehicle.

In the organ-type pedal device 1, a portion of the pedal pad 40 that is in front of the vehicle than the swing axis CL swings toward a floor 2 or a dash panel in an occupant compartment in response to an increase in the pedaling force of the driver applied to the pedal pad 40. Such a pedal device 1 is used as an accelerator pedal device, a brake pedal device, or the like. In the present embodiment, a brake pedal device is described as an example of the pedal device 1. In the following description, the floor 2 or the dash panel of the vehicle to which the pedal device 1 is attached is referred to as a vehicle body.

Figure 5:
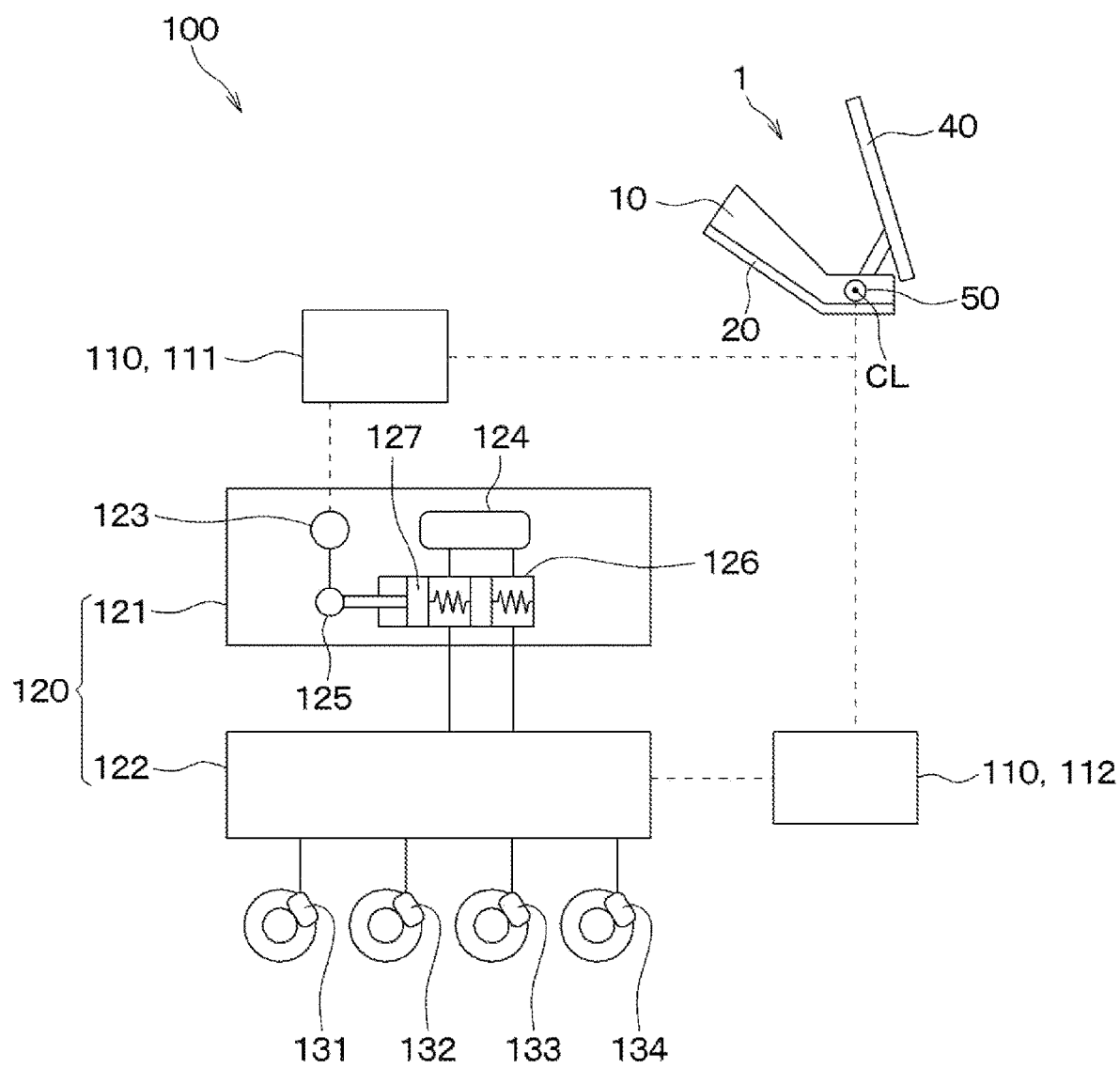
FIG. 5 is a configuration diagram of a brake-by-wire system using the pedal device according to the first embodiment.

First, a brake-by-wire system 100 using the pedal device 1 of the present embodiment is described. As shown in FIG. 5, the brake-by-wire system 100 is a system in which an electronic control unit (hereinafter referred to as an ECU 110) mounted on the vehicle drives a brake circuit 120 based on an electric signal output from a sensor unit 50 of the pedal device 1. The brake circuit 120 generates hydraulic pressure required for braking the vehicle to drive wheel cylinders 131 to 134.

In the brake-by-wire system 100 illustrated in FIG. 5, the ECU 110 is made of a first ECU 111 and a second ECU 112. Also, the brake circuit 120 includes a first brake circuit 121 and a second brake circuit 122.

An electric signal output from the sensor unit 50 of the pedal device 1 is transmitted to the first ECU 111 and the second ECU 112. The first ECU 111 has a computer, a drive circuit, and the like (not shown). The first ECU 111 supplies electric power to a motor 123 of the first brake circuit 121 and the like to drive and control the first brake circuit 121. The second ECU 112 also has a computer and a drive circuit, and the like (not shown). The second ECU 112 drives and controls an electromagnetic valve, a motor, and the like (not shown) of the second brake circuit 122.

The first brake circuit 121 has a reservoir 124, a motor 123, a gear mechanism 125, a master cylinder 126 and the like. The reservoir 124 stores brake fluid. The motor 123 drives the gear mechanism 125. The gear mechanism 125 reciprocates a master piston 127 of the master cylinder 126 in an axial direction of the master cylinder 126. Due to movement of the master piston 127, the hydraulic pressure of the brake fluid supplied from the reservoir 124 to the master cylinder 126 is increased, and the hydraulic pressure is supplied from the first brake circuit 121 to the second brake circuit 122.

The second brake circuit 122 is a circuit for executing a normal control, an ABS control, a VSC control, etc. by controlling the hydraulic pressure supplied to each of wheel cylinders 131 to 134 according to the control signal from the second ECU 112. ABS stands for Anti-lock Braking System, and VSC stands for Vehicle Stability Control. The wheel cylinders 131 to 134 arranged on each wheel drive brake pads provided on each wheel.

When a driver in a vehicle performs a step-on operation to the pedal pad 40 of the pedal device 1, a signal corresponding to a swing angle (that is, pedal operation amount) of the pedal pad 40 is output from the sensor unit 50 to the first ECU 111 and the second ECU 112. The first ECU 111 drives the motor 123 to decelerate the vehicle. As a result, when a rotation speed of the motor 123 increases, the master cylinder 126 increases hydraulic pressure of the brake fluid supplied from the reservoir 124. The resultant hydraulic pressure of the brake fluid is transmitted from the first brake circuit 121 to the second brake circuit 122.

The second ECU 112 performs the normal control, the ABS control, the VSC control, and the like. For example, the second ECU 112 controls driving of each solenoid valve of the second brake circuit 122 in the normal control for braking according to the operation of the pedal pad 40 by the driver. The second ECU 112 then causes the hydraulic pressure supplied from the first brake circuit 121 to be supplied to each of the wheel cylinders 131 to 134 via the second brake circuit 122. Therefore, the brake pads driven by the respective wheel cylinders 131 to 134 each come into frictional contact with the corresponding brake disc, thereby a brake is applied to each wheel, and the vehicle decelerates.

Also, for example, the second ECU 112 calculates a slip ratio of each wheel based on the speed of each wheel of the vehicle and the vehicle speed, and performs ABS control based on the calculation result of the slip rate. Under the ABS control, the hydraulic pressure supplied to each of the wheel cylinders 131 to 134 is adjusted, to prevent each wheel from being locked. Also, for example, the second ECU 112 calculates a sideslip state of the vehicle based on a yaw rate, a steering angle, an acceleration, a speed of each wheel, a vehicle speed, etc., and performs VSC control based on the calculation result. Under the VSC control, a control target wheel for stabilizing the vehicle turning is selected, and the hydraulic pressure of the wheel cylinders 131 to 134 corresponding to the selected wheel(s) is raised, to prevent the sideslip of the vehicle. Thus, the vehicle can travel stably. Further to the normal control, ABS control, and VSC control described above, the second ECU 112 may perform a collision avoidance control, a regenerative cooperation control, and the like based on signals from other ECUs (not shown).

Next, the pedal device 1 is explained. As shown in FIGS. 1 to 4, the pedal device 1 includes a first housing 10, a second housing 20, a reaction force generation mechanism 30, the pedal pad 40, the sensor unit 50, and the like.

The first housing 10 is a member that holds or covers at least one of a rotation shaft 41 of the pedal pad 40, the sensor unit 50 and the reaction force generation mechanism 30. The first housing 10 of the present embodiment is made of resin, for example. The first housing 10 is shaped like a box having a top wall 11, a left side wall 12, a right side wall 13, a front wall 14, and the like. A space for arranging the sensor unit 50, the reaction force generation mechanism 30, and the like is provided inside the first housing 10 of the present embodiment.

The first housing 10 has an opening 15 into which the reaction force generation mechanism 30 can be inserted in at least one direction. Specifically, the first housing 10 of the present embodiment has the largest opening 15 on one side facing the vehicle body on which the pedal device 1 is installed. It can also be said that the first housing 10 of the present embodiment has the largest opening 15 on one side of the pedal pad 40 in a swing direction. The largest opening 15 of the first housing 10 has a size that allows an elastic member of the reaction force generation mechanism 30 to be inserted without bending during a manufacturing process of the pedal device 1. Further, the largest opening 15 of the first housing 10 is configured to be closed by the second housing 20. Thus, the first housing 10 of the present embodiment covers the reaction force generation mechanism 30 together with the second housing 20.

Further, the first housing 10 of the present embodiment has a cylindrical bearing portion 16 that rotatably supports the rotation shaft 41 that is provided on the swing axis CL of the pedal pad 40. The rotation shaft 41 of the pedal pad 40 is a columnar shaft rotatably provided in the bearing portion 16. The sensor unit 50 for detecting a rotation angle of the rotation shaft 41 is provided on or about the axis CL of the rotation shaft 41 of the pedal pad 40. Therefore, the first housing 10 of the present embodiment holds and covers the rotation shaft 41 of the pedal pad 40 and a part of the sensor unit 50.

Since the sensor unit 50 is provided on or about the axis CL of the rotation shaft 41, it is possible to directly detect the rotation angle of the rotation shaft 41. As the sensor unit 50, for example, it is possible to adopt a non-contact sensor circuit using a Hall IC or a magnetoresistive element, or a contact sensor circuit. The sensor unit 50 outputs a signal corresponding to the rotation angle of the rotation shaft 41 from a connector 51 provided outside the first housing 10 to the ECU 110 of the vehicle. The rotation angle of the rotation shaft 41 and the swing angle of the pedal pad 40 (that is, the pedal operation amount) are the same.

The second housing 20 is provided on one side of the first housing 10 in a direction in which the pedal pad 40 swings. The second housing 20 is provided to close the largest opening 15 of the first housing 10. The second housing 20 of the present embodiment extends continuously from a portion of the first housing 10 on the front side of the vehicle to a portion on the rear side of the vehicle. The first housing 10 and the second housing 20 are fixed by, for example, a fixing member such as a bolt 60 inserted from a surface of the second housing 20 on a vehicle body side to a first housing 10 side. The method of fixing the first housing 10 and the second housing 20 is not limited to the above, and various methods can also be adopted as described later in the thirteenth to twenty-second embodiments.

The second housing 20 is made of a member having a Young's modulus greater than that of the first housing 10, or has a member having a Young's modulus greater than that of the first housing 10 at least in part. In the following description, a member having a Young's modulus greater than that of the first housing 10 is referred to as a "rigid portion 21." The rigid portion 21 can be made of metal, for example. The rigid portion can also be rephrased as a high-strength portion. The second housing 20 of the present embodiment is entirely made of the rigid portion 21. The second housing 20 of the present embodiment can be manufactured, for example, by pressing a metal material, sheet metal working, cold forging, warm forging, or the like.

A configuration in which the second housing 20 has the rigid portion 21 as a part of a resin portion is described later in the eleventh and twelfth embodiments.

The second housing 20 is arranged at a position between (i) an opposite portion of the reaction force generation mechanism 30 opposite to the pedal pad 40 and (ii) the vehicle body. The second housing 20 supports a portion of the reaction force generation mechanism 30 opposite to the pedal pad 40. In the present embodiment, the portion of the reaction force generation mechanism 30 opposite to the pedal pad 40 corresponds to one end 311 of a leaf spring 31 of the reaction force generation mechanism 30. Since the second housing 20 of the present embodiment is entirely made of the rigid portion 21, even when a high load is input from the reaction force generation mechanism 30, an amount of deformation of a portion 22 (i.e., a first portion 22) of the second housing 20 supporting the reaction force generation mechanism 30 is small. Note that the portion 22 that supports the reaction force generation mechanism 30 may also be called as a spring receiving portion 22.

Further, the second housing 20 also integrally has a portion 23 (i.e., a second portion 23) that is fixed to the vehicle body, in addition to the portion 22 that supports the reaction force generation mechanism 30. In the second housing 20, the portion 22 supporting the reaction force generation mechanism 30 and the portion 23 that is fixed to the vehicle body are integrally formed by the rigid portion 21. The portion 23 fixed to the vehicle body extends leftward and rightward from the first housing 10, and is provided with a hole 24 piercing in a plate thickness direction. The second housing 20 is fixed to the floor 2 or the dash panel of the vehicle by inserting a bolt (not shown) through the hole 24. The dash panel is a partition wall that separates the interior of the vehicle from the exterior such as the engine room of the vehicle, and is sometimes called as a bulkhead.

The pedal pad 40 is made of, for example, metal or resin in a plate-like shape, and is arranged obliquely with respect to the floor 2. Specifically, the pedal pad 40 is obliquely arranged so that an upper end thereof faces the front of the vehicle and a lower end thereof faces the rear of the vehicle. A thick portion 42 is provided on an upper portion of the pedal pad 40 as a portion to be stepped on by the driver. The thick portion 42 is arranged above the swing axis CL of the pedal pad 40 in the vertical direction when the pedal pad 40 is mounted on the vehicle. The arrangement of the pedal pad 40 is not limited to the one shown in FIGS. 1 to 4, that is, may also be arranged substantially perpendicular to the floor 2, for example.

A connecting plate 43 is provided on a back surface of the pedal pad 40. The connecting plate 43 integrally has a back plate portion 44 fixed to a back surface of the pedal pad 40 and a side plate portion 45 substantially perpendicular to the back plate portion 44. The side plate portion 45 of the connecting plate 43 is fixed to the rotation shaft 41. As described above, the rotation shaft 41 is rotatably supported by the bearing portion 16 of the first housing 10. Therefore, the pedal pad 40 swings about the axis CL of the rotation shaft 41 in a forward and reverse rotation directions within a predetermined angle range when the pedal pad 40 is stepped on by the driver's foot. By configuring the connecting plate 43 to have the back plate portion 44 and the side plate portion 45, the pedal pad 40 and the rotation shaft 41 are arranged in separated positions, and the sensor unit 50 is easily arrangeable in a space close to the rotation shaft 41.

The reaction force generation mechanism 30 is a mechanism that generates a reaction force against the driver's pedaling force applied to the pedal pad 40. Since the pedal device 1 includes the reaction force generation mechanism 30, even if a mechanical connection between the pedal pad 40 and the master cylinder 126 is eliminated, it is possible to obtain a reaction force similar to that of a conventional brake system. Note that the conventional brake system refers to a configuration in which the pedal pad and the master cylinder are mechanically connected, and the pedal pad receives a hydraulic reaction force from the master cylinder.

In the present embodiment, the reaction force generation mechanism 30 has a plurality of elastic members. Specifically, the reaction force generation mechanism 30 has a leaf spring 31, a large-diameter coil spring 33, and a small-diameter coil spring 34 as a plurality of elastic members. By configuring the reaction force generation mechanism 30 to have a plurality of elastic members, the reaction force of the reaction force generation mechanism 30 is changeable in multiple stages with respect to changes in the swing angle of the pedal pad 40 (that is, the amount of pedal operation). As a result, the reaction force generation mechanism 30 can reproduce the multistage reaction force characteristics that are unique to the conventional brake system.

The leaf spring 31 is bent to form a convex curved surface toward the floor 2 when not receiving a load. The one end 311 of the leaf spring 31 (that is, a portion of the reaction force generation mechanism 30 opposite to the pedal pad 40) is arranged at a position between the rotation shaft 41 of the pedal pad 40 and the second housing 20. The one end 311 of the leaf spring 31 is fixed to the portion 22 of the second housing 20 that supports the reaction force generation mechanism 30.

On the other hand, at an other end 312 of the leaf spring 31, a lower holder 35, the large-diameter coil spring 33, a spring seat 36, a small-diameter coil spring 34, an upper holder 37, a connecting rod 70, etc. are provided from a leaf spring 31 side. The lower holder 35 is fixed to the other end 312 of the leaf spring 31. The large-diameter coil spring 33 has one end on a leaf spring 31 side supported by the lower holder 35 and other end on a pedal pad 40 side supported by the spring seat 36. The small-diameter coil spring 34 has one end on a leaf spring 31 side supported by the spring seat 36 and other end on a pedal pad 40 side supported by the upper holder 37. The connecting rod 70 has one end on a pedal pad 40 side fixed to the pedal pad 40, and other end on a leaf spring 31 side slidably contacts the upper holder 37. The connecting rod 70 may also be configured such that one end on a pedal pad 40 side is swingably connected to the pedal pad 40 and other end on a leaf spring 31 side swingably connected to the upper holder 37. The connecting rod 70 is inserted through an upper opening 17 provided in the first housing 10. The upper opening 17 is sized to allow the small-diameter coil spring 34 and the upper holder 37 to pass therethrough.

With such configuration, when the driver applies a pedaling force to the pedal pad 40 and the pedal pad 40 swings toward the first housing 10 and the second housing 20, a load is applied to various members of the reaction force generation mechanism 30 from the pedal pad 40 via the connecting rod 70. Therefore, the leaf spring 31, the large-diameter coil spring 33, and the small-diameter coil spring 34, which constitute the reaction force generation mechanism 30, bend according to their respective spring constants, and generate a reaction force against the pedaling force applied to the pedal pad 40 by the driver. Specifically, when a load is applied to each of the members of the reaction force generation mechanism 30 from the pedal pad 40 via the connecting rod 70, the large-diameter coil spring 33 and the small-diameter coil spring 34 bend in their spring axial directions. Further, the leaf spring 31 bends so that a portion thereof on an other end 312 side to which the lower holder 35 is fixed comes closer to the second housing 20. The configurations of the reaction force generation mechanism 30 and the connecting rod 70 are not limited to those illustrated above, and various configurations are adoptable.

A covering member 71 is provided around the connecting rod 70. The covering member 71 is made of rubber, for example, and is formed in a tubular and bellows shape. On one side of a cylindrical shape, the covering member 71 engages with a groove 72 provided in the middle of the connecting rod 70, and on other side of the cylindrical shape, the covering member 71 engages with the upper opening 17 of the first housing 10. The covering member 71 prevents foreign substances, water, and the like from entering the inside of the first housing 10 through the upper opening 17 of the first housing 10.

The pedal device 1 shown in FIGS. 1 to 4 is, respectively in a state where the pedaling force of the driver is not applied to the pedal pad 40 (that is, the initial position of the pedal pad 40). An initial position of the pedal pad 40 is regulated by a full-close stopper (not shown).

Although not shown, in the pedal device 1, the pedal pad 40 swings about the axis CL of the rotation shaft 41 when a driver's pedaling force is applied to the pedal pad 40. In such manner, the portion of the pedal pad 40 that is above in the vehicle with respect to the axis CL moves toward the floor 2 or the dash panel. At this time, the sensor unit 50 outputs a signal corresponding to the rotation angle of the rotation shaft 41 (that is, the swing angle of the pedal pad 40) to the ECU 110 of the vehicle. The ECU 110 drives and controls the brake circuit 120 to generate hydraulic pressure required for braking the vehicle, and the hydraulic pressure drives the brake pads to decelerate or stop the vehicle.

Next, a method for manufacturing the pedal device 1 of the first embodiment is described. In the method of manufacturing the pedal device 1 of the first embodiment, first, the rotation shaft 41 and the pedal pad 40 are assembled to the first housing 10 to form a first sub-assembly. On the other hand, the reaction force generation mechanism 30 is assembled to the second housing 20 to form a second sub-assembly. Then, the first housing 10 and the second housing 20 are fixed with a fixing member such as a bolt 60, and the first sub-assembly and the second sub-assembly are assembled. At this time, the plurality of elastic members of the reaction force generation mechanism 30 assembled to the second housing 20 are arrangeable to the inside of the first housing 10 from the largest opening 15 of the first housing 10 without bending. Thereafter, the first housing 10 and the second housing 20 may be fixed. To bend the plurality of elastic members arranged inside the first housing 10, for example, the elastic members may be pressed by the connecting rod 70 attached to the pedal pad 40, or the connecting rod 70 attached to the upper holder 37 may be pressed by the pedal pad 40. Alternatively, a jig or the like may be used to bend the plurality of elastic members. Thus, assembly of the pedal device 1 of the first embodiment is easily performable to have each of the various members assembled in position, which is achieved by the improved assemblability of each of those members in the manufacturing process.

The pedal device 1 of the first embodiment described above has the following effects.

(1) In the first embodiment, the pedal device 1 has a configuration in which the first housing of the pedal device 1 has the largest opening 15 into which the elastic member of the reaction force generation mechanism 30 in the non-bending state is insertable, and the largest opening 15 is closed by the second housing 20.

According to the above, in the manufacturing process of the pedal device 1, the elastic member of the reaction force generation mechanism in the non-bending state is arranged and assembled at a position between the first housing and the second housing from the largest opening. Therefore, when the reaction force generation mechanism is assembled at a position between the first housing and the second housing, there is no need to provide a jig that bends the reaction force generation mechanism. Therefore, in such pedal device, each of the components is easily assembled, i.e., the pedal device has an improved assemblability.

Further, since the first housing 10 is configured to cover the reaction force generation mechanism 30 together with the second housing 20, foreign matter is prevented from entering into the reaction force generation mechanism 30.

(2) In the first embodiment, a bending direction of the elastic member in the reaction force generation mechanism 30, a swing direction of the pedal pad 40, and an assembly direction of the first housing 10 and the second housing 20 are in parallel with a virtual plane that is perpendicular to the axis CL.

In such manner, in the manufacturing process of the pedal device 1, when assembling the connecting rod 70 and the reaction force generation mechanism 30, assembling is performable while the elastic member provided in the reaction force generation mechanism 30 is being bent.

(3) In the first embodiment, the pedal device 1 has the bearing portion 16 that rotatably supports the rotation shaft 41 of the pedal pad 40. Further, the second housing 20 supports an opposite portion of the reaction force generation mechanism 30 with regard to the pedal pad 40.

In such manner, in the manufacturing process of the pedal device 1, it is possible to form the first sub-assembly by assembling the rotation shaft 41 and the pedal pad 40 to the first housing 10, and, on the other hand, to form the second sub-assembly by assembling the second housing 20 and the reaction force generation mechanism 30. Then, by assembling the first sub-assembly and the second sub-assembly, the pedal device 1 is easily assembled, and the assemblability of the pedal device 1 is improvable.

Further, even when a high load is input from the reaction force generation mechanism 30 to the second housing 20 when a pedaling force is input from the driver to the pedal pad 40, the transmission of load from the second housing 20 to the first housing 10 is divided, thereby the first housing 10 is not susceptible to such a load. Thus, by providing the bearing portion 16 in the first housing 10, the pedal pad 40 is stably swingable, thereby improving the reliability of the output signal of the sensor unit 50.

(4) In the first embodiment, the pedal device 1 has a configuration in which the rigid portion 21 of the second housing 20 having a Young's modulus greater than that of the first housing 10 supports the reaction force generation mechanism 30 on the opposite side relative to the pedal pad 40. As a result, even when the driver applies a pedaling force to the pedal pad 40 and a high load is input from the reaction force generation mechanism 30 to the second housing 20, the amount of deformation of the second housing 20 formed by the rigid portion 21 is small. Therefore, the reaction force generation mechanism 30 can generate a stable reaction force toward the pedal pad 40. Therefore, in the pedal device 1, by adding the required-minimum members such as the second housing 20 to the portion 22 that supports the reaction force generation mechanism 30, the pedaling force characteristics are stabilized and the weight increase of the pedal device 1 is minimized, thereby reducing the weight thereof.

(5) In the first embodiment, the second housing 20 made up of the rigid portion 21 is arranged at a position between (i) the portion of the reaction force generation mechanism 30 opposite to the pedal pad 40 (the one end 311 of the leaf spring 31 in the first embodiment) and (ii) the vehicle body. According to the above, even when a pedaling force is applied to the pedal pad 40 by the driver and a high load is input to the second housing 20 from the reaction force generation mechanism 30, the amount of deformation of the second housing 20 constituted by the rigid portion 21 is small.

(6) In the first embodiment, the second housing 20 integrally has the portion 23 that is fixed to the vehicle body, in addition to the portion 22 that supports the reaction force generation mechanism 30. According to the above, by fixing the pedal device 1 and the vehicle body using the portion 23 of the second housing 20 that is fixed to the vehicle body, deformation of the pedal device 1 when mounted on the vehicle is suppressible. Therefore, it is possible to stabilize the pedaling force characteristics and to minimize an increase in the weight of the pedal device 1, thereby achieving weight reduction.

(7) In the first embodiment, the second housing 20 is made of metal. According to the above, metal is exemplified as the rigid portion 21 having a Young's modulus greater than that of the first housing 10.

(8) In the first embodiment, the reaction force generation mechanism 30 has a plurality of elastic members. According to the above, it is possible to change the reaction force of the reaction force generation mechanism 30 in multiple stages with respect to the change in the pedal operation amount, so that the multistage reaction force characteristic specific to the conventional brake system can be reproducible.

(9) In the first embodiment, the multiple elastic members include at least one leaf spring 31. The leaf spring 31 is fixed to the rigid portion 21 of the second housing 20. In case that the elastic member of the reaction force generation mechanism 30 is composed only of a coil spring, a space corresponding to "diameter of coil spring×number of turns" and "deflection amount" is required. On the other hand, when the leaf spring 31 is used as the elastic member of the reaction force generation mechanism 30, it is sufficient to have a space corresponding to the "thickness of the leaf spring 31" and the "deflection amount." Therefore, the space required for installing the leaf spring 31 is smaller than the space required for installing the coil spring. Thus, by using the leaf spring 31 as the elastic member of the reaction force generation mechanism 30, the pedal device 1 can reduce the volume inside the first housing 10. As a result, the pedal device 1 is downsized.

(10) The pedal device 1 of the first embodiment is a brake pedal device used in the brake-by-wire system 100 in which a brake circuit generates hydraulic pressure required for braking the vehicle by drive control of the ECU 110 based on the output signal of the sensor unit 50. According to the above, by using the pedal device 1 in the brake-by-wire system 100, an accurate vehicle braking control is realized by the drive control of the ECU 110 based on the electric signal with high detection accuracy which is output from the sensor unit 50 of the pedal device 1.

Second Embodiment

The second embodiment is described with reference to FIGS. 6 to 11. In the second embodiment, the configuration of a reaction force generation mechanism 30 is changed with respect to the first embodiment, while the rest of the configuration is unchanged therefrom, thereby focusing the description only on such change from the first embodiment.

Figure 6:
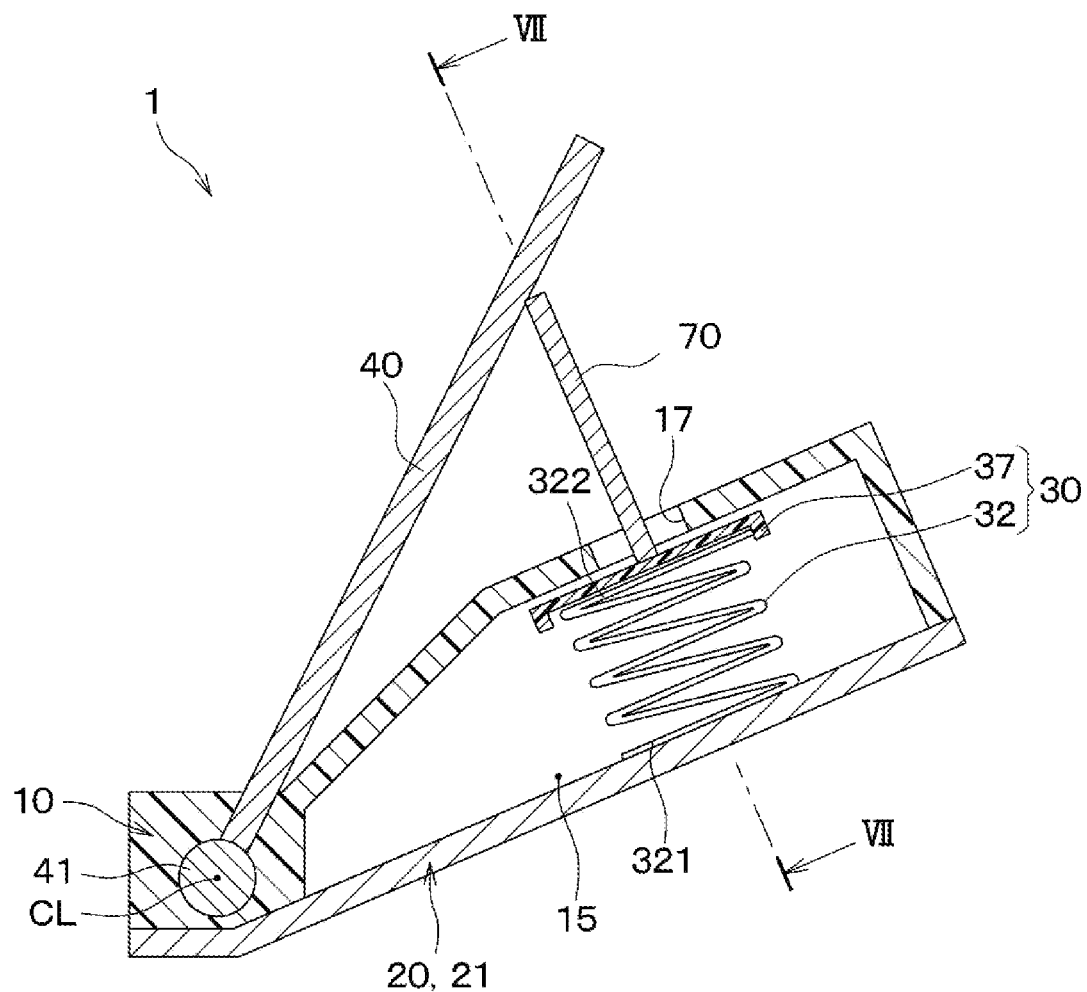
FIG. 6 is a cross-sectional view along a virtual plane perpendicular to a pivot axis of a pedal pad in a pedal device according to a second embodiment.
Figure 7:
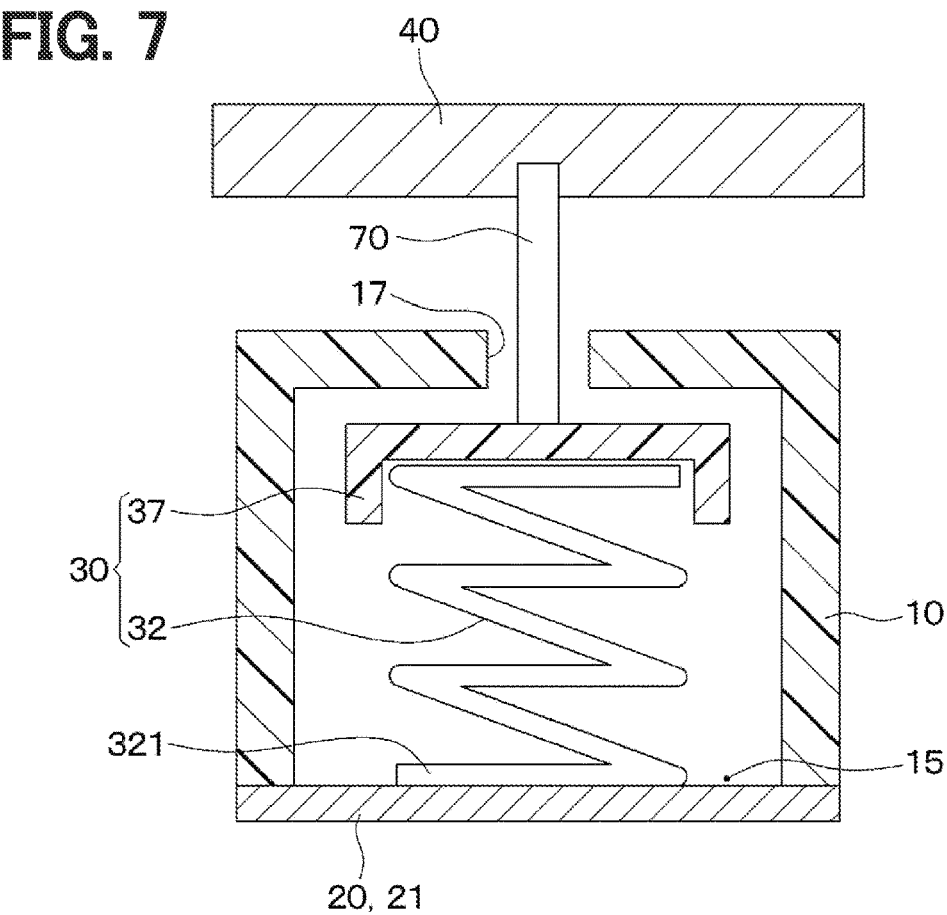
FIG. 7 is a cross-sectional view taken along a line VII-VII in FIG. 6.

As shown in FIGS. 6 and 7, a pedal device 1 of the second embodiment also includes a first housing 10, a second housing 20, a reaction force generation mechanism 30, a pedal pad 40, a sensor unit, and the like. In each of the drawings referred to in or after the second embodiment, the configuration is shown in a simplified manner, and illustration of the sensor unit or the like is omitted.

The first housing 10 has a largest opening 15 provided on one side facing the vehicle body, on which the pedal device 1 is installed. The opening 15 of the first housing 10 is closed by the second housing 20. The second housing 20 is made of the rigid portion 21 having a Young's modulus greater than that of the first housing 10. The second housing 20 of the second embodiment is also composed entirely of the rigid portion 21.

The reaction force generation mechanism 30 has one elastic member and an upper holder 37. The one elastic member is made of a coil spring 32. A lower end portion of the coil spring 32 opposite to the pedal pad 40 is supported by the second housing 20. In the second embodiment, a lower end portion 321 of the coil spring 32 corresponds to a portion of the reaction force generation mechanism 30 opposite to the pedal pad 40. That is, the second housing 20 supports a portion of the reaction force generation mechanism 30 opposite to the pedal pad 40. Also in the second embodiment, the second housing 20 is entirely made of the rigid portion 21. Therefore, even when a high load is input from the reaction force generation mechanism 30, the amount of deformation of the portion 22 of the second housing 20 that supports the reaction force generation mechanism 30 is small.

The upper holder 37 is provided at an upper end portion 322 of the coil spring 32 on the pedal pad 40 side. The upper holder 37 and the pedal pad 40 are connected by a connecting rod 70. The connecting rod 70 has one end on a pedal pad 40 side fixed to the pedal pad 40 and another end on a leaf spring 31 side slidably contacting the upper holder 37. The connecting rod 70 may also be configured such that one end on a pedal pad 40 side is swingably connected to the pedal pad 40 and other end on a leaf spring 31 side swingably connected to the upper holder 37. The connecting rod 70 is inserted through the upper opening 17 provided in the first housing 10. In the second embodiment, the upper opening 17 is formed to be smaller than an outer diameter of the upper holder 37. In other words, the upper opening 17 has a size through which the connecting rod 70 is insertable, but a size through which the upper holder 37 is not insertable.

Figure 8:
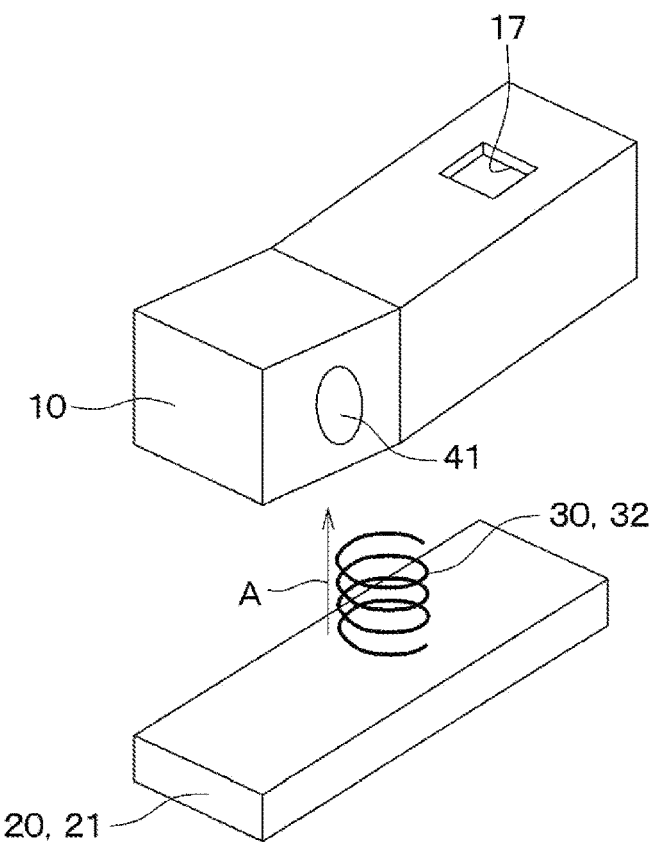
FIG. 8 is a diagram for explaining a method of assembling the first housing and the second housing in the pedal device according to the second embodiment.

Next, a method for manufacturing the pedal device 1 of the second embodiment is described. As shown in FIG. 8, in the pedal device 1 of the second embodiment, the rotation shaft 41 and the pedal pad 40 are assembled to the first housing 10 to form the first sub-assembly, like the first embodiment. On the other hand, the reaction force generation mechanism 30 is assembled to the second housing 20 to form the second sub-assembly. Then, as indicated by an arrow A in FIG. 8, the reaction force generation mechanism 30 is inserted through the opening 15 of the first housing 10, and the first sub-assembly and the second sub-assembly are assembled. It should be noted that the pedal pad 40 is omitted in FIG. 8.

Figure 9:
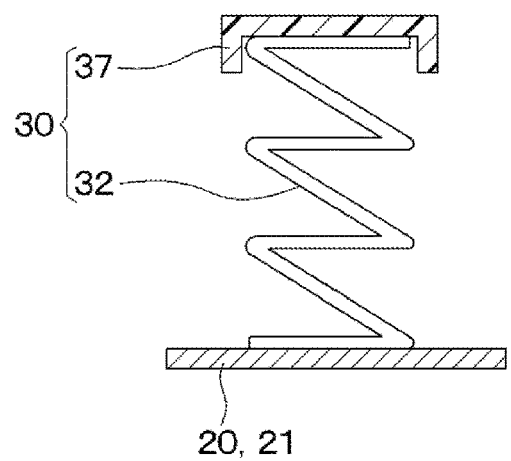
FIG. 9 is a diagram for explaining a method of assembling each member in the pedal device according to the second embodiment.

Now, the details of the method of manufacturing the pedal device 1 of the second embodiment are described with reference to FIGS. 9 to 11. First, as shown in FIG. 9, the coil spring 32 of the reaction force generation mechanism 30 is installed on the second housing 20, and the upper holder 37 is installed on the coil spring 32. The second sub-assembly is composed in such manner. At this time, the coil spring 32 is substantially in a free length state. It should be noted that there is no problem even if the coil spring 32 is slightly bent.

Figure 10:
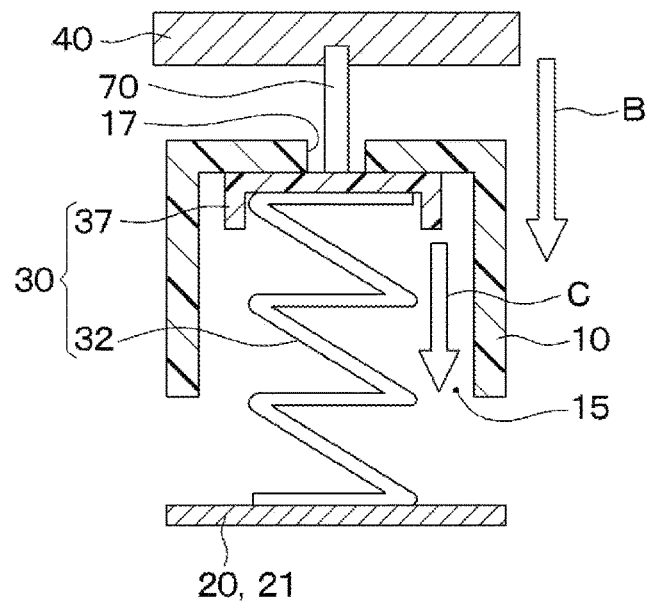
FIG. 10 is a diagram subsequent to FIG. 9 for explaining a method of assembling each member in the pedal device according to the second embodiment.

Next, as shown in FIG. 10, the first sub-assembly in which the rotation shaft 41 and the pedal pad 40 are assembled with the first housing 10 is brought to the above of the second sub-assembly. Then, as shown by arrows B and C in FIG. 10, while the coil spring 32 and the upper holder 37 are inserted inside the first housing 10 and the coil spring 32 is bent, the housing 10 is moved toward the second housing 20 until it touches the second housing 20. At this time, the second housing 20 may be moved toward the first housing 10.

Figure 11:
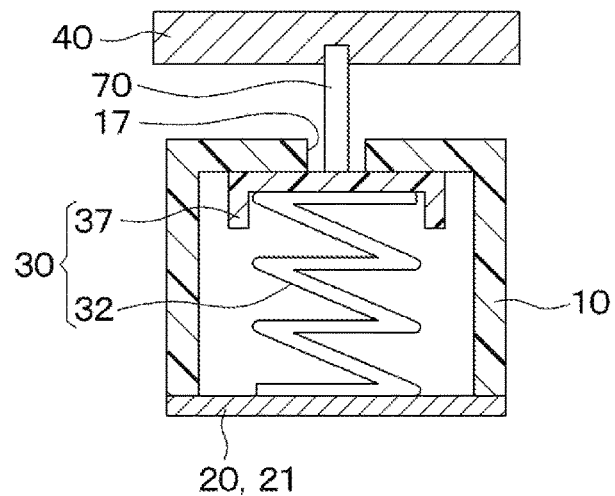
FIG. 11 is a diagram subsequent to FIG. 10 for explaining a method of assembling each member in the pedal device according to the second embodiment.

Subsequently, as shown in FIG. 11, the first housing 10 and the second housing 20 are fixed with fixing members such as bolts, which are not illustrated, and the first sub-assembly and the second sub-assembly are assembled. Thus, each of the members of the pedal device 1 of the second embodiment is also easily assembled, thereby the assemblability of each of the members in the manufacturing process is improvable.

The pedal device 1 of the second embodiment described above achieves the same effects as the first embodiment due to the corresponding configuration as the first embodiment. Further, in the second embodiment, the bending direction of the elastic member of the reaction force generation mechanism 30 and the assembling direction of the first housing 10 and the second housing 20 are both in parallel with a virtual plane perpendicular to the axis CL. Therefore, in the manufacturing process of the pedal device 1, assembling the first housing 10 and the second housing 20 is complete, while the elastic member of the reaction force generation mechanism 30 is bent.

As a modification of the second embodiment, although not shown in any drawings, a method of bending the coil spring 32 when moving the first housing 10 toward the second housing 20 may also include the following, other than the method shown in FIG. 10. For example, in one case, the pedal pad 40 may be attached to the connecting rod 70 in advance, and the lower end of the connecting rod 70 may be used to press the upper holder 37, for bending the coil spring 32. Alternatively, a method of bending the coil spring 32 may be, for example, attaching the connecting rod 70 to the upper holder 37 in advance, and the pedal pad 40 may be used to press an upper end portion of the connecting rod 70, for bending the coil spring 32.

Third embodiment

The third embodiment is described with reference to FIGS. 12 and 13. The third embodiment has a change in the configuration of the first housing 10 and the second housing 20 with respect to first embodiment and the like, and the rest is the same as that of first embodiment and the like. Therefore, only parts different from the first embodiment and the like is described.

Figure 12:
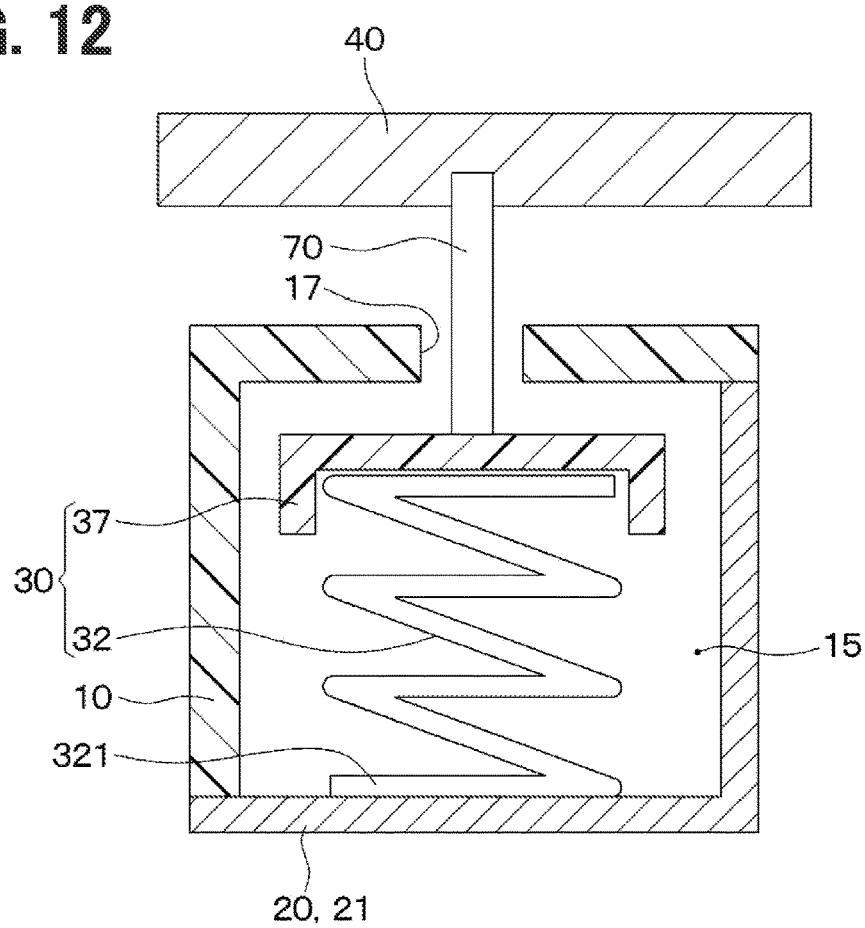
FIG. 12 is a sectional view showing a portion corresponding to FIG. 7 in a pedal device according to a third embodiment.
Figure 13:
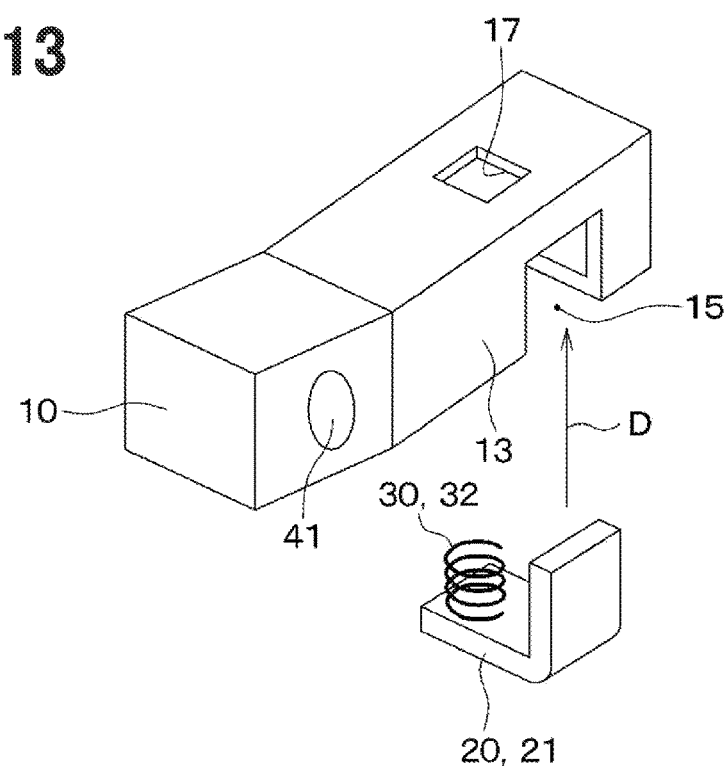
FIG. 13 is a diagram for explaining a method of assembling a first housing and a second housing in the pedal device according to the third embodiment.

As shown in FIGS. 12, 13, in the third embodiment, a first housing 10 of a pedal device 1 is provided with an opening 15 formed as a part of a right side wall 13 and a bottom wall. The bottom wall of the first housing 10 is a wall thereof facing the vehicle body on which the pedal device 1 is installed.

On the other hand, a second housing 20 is formed in an L shape and is configured to close the opening 15 of the first housing 10. The second housing 20 is made of the rigid portion 21 having a Young's modulus greater than that of the first housing 10. The second housing 20 of the third embodiment is also composed entirely of the rigid portion 21.

A reaction force generation mechanism 30 has one elastic member and an upper holder 37. One elastic member is made of a coil spring 32. A lower end portion of the coil spring 32 opposite to a pedal pad 40 is supported by the second housing 20. In the third embodiment, a lower end portion 321 of the coil spring 32 corresponds to a portion of the reaction force generation mechanism 30 opposite to the pedal pad 40. That is, the second housing 20 supports a portion of the reaction force generation mechanism 30 opposite to the pedal pad 40. Since the second housing 20 is made of a rigid portion, even when a high load is input from the reaction force generation mechanism 30, the amount of deformation of the second housing 20 is small.

Next, a method of manufacturing the pedal device 1 according to the third embodiment is described. As shown in FIG. 13, in the pedal device 1 of the third embodiment, a rotation shaft 41 and the pedal pad 40 are assembled to the first housing 10 in the same manner as in the first embodiment, to compose the first sub-assembly. On the other hand, the reaction force generation mechanism 30 is assembled to the second housing 20 to compose the second sub-assembly. Further, as indicated by an arrow D in FIG. 13, the first sub-assembly and the second sub-assembly are assembled while the reaction force generation mechanism is inserted from under or from a side of the opening 15 of the first housing 10. Note that the pedal pad 40 is omitted in FIG. 13.

The pedal device 1 of the third embodiment described above can also achieve the same effects as the first embodiment and the like, based on the same or similar configuration as the first embodiment and the like.

Fourth to Tenth Embodiments

In the fourth to tenth embodiments described below, the configuration regarding a rotation shaft 41 and a bearing portion 16 of a pedal pad 40 has been changed from the first embodiment and the like, while the other parts are similar to those of the first embodiment and the like. Therefore, in the fourth to tenth embodiments, only the parts different from the first embodiment are mainly described.

Fourth Embodiment

Figure 14:
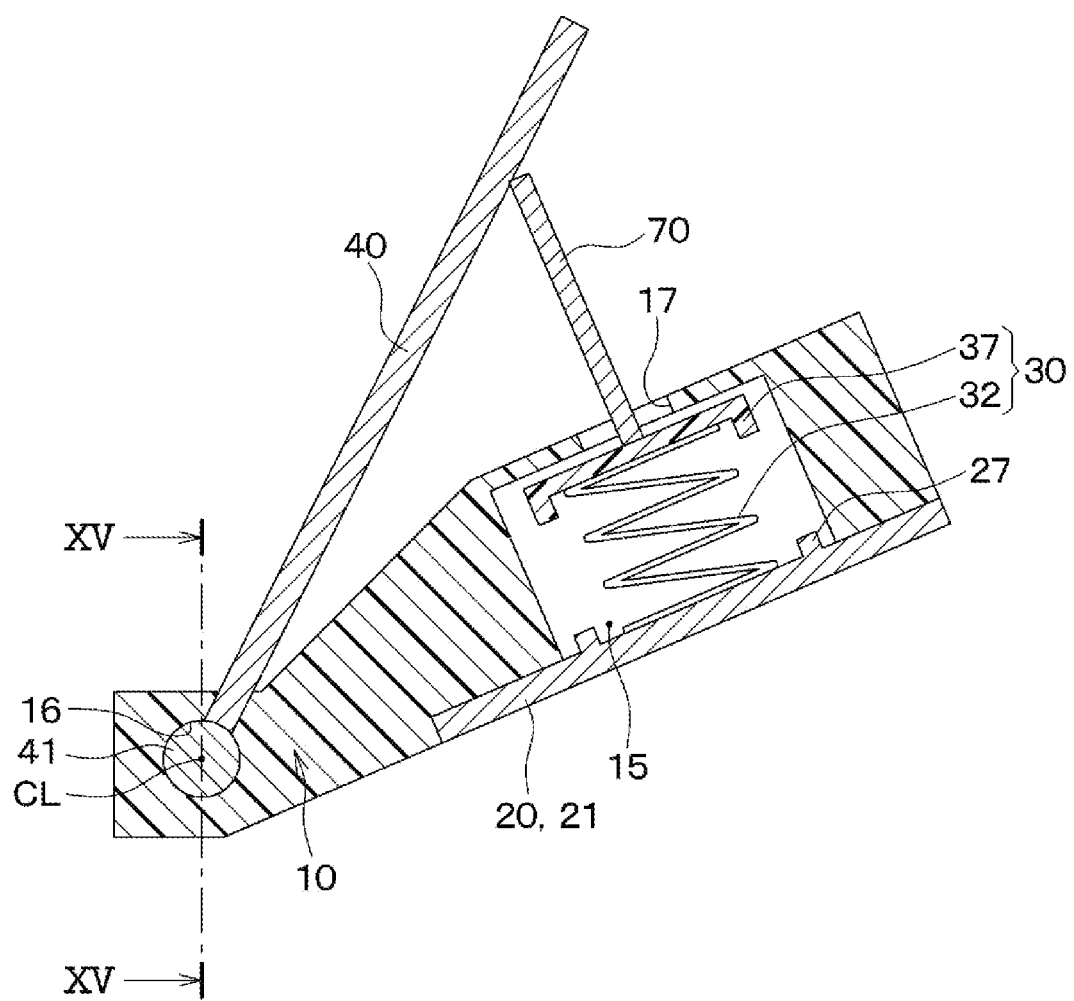
FIG. 14 is a cross-sectional view along a virtual plane perpendicular to a pivot axis of a pedal pad in a pedal device according to a fourth embodiment.
Figure 15:
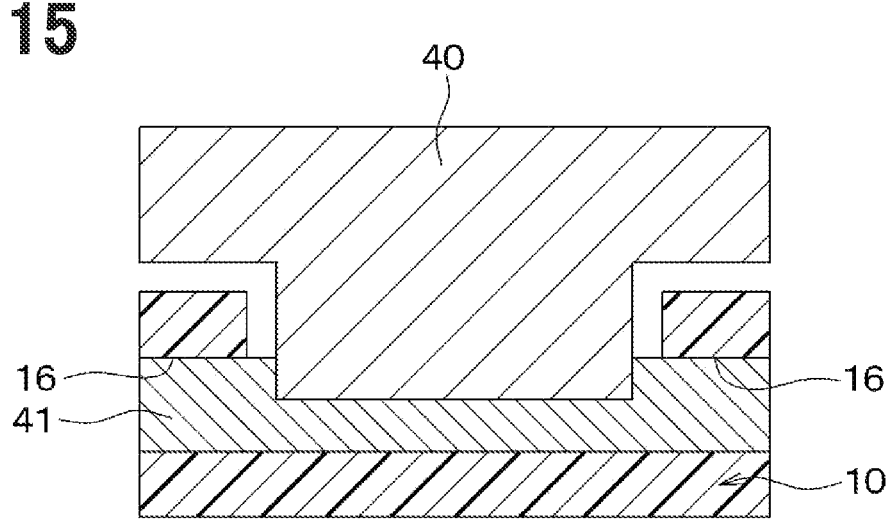
FIG. 15 is a cross-sectional view taken along a line XV-XV of FIG. 14.

As shown in FIGS. 14 and 15, in the fourth embodiment, a bearing portion 16 that supports a rotation shaft 41 of a pedal pad 40 is provided in a first housing 10 just like the first embodiment. Specifically, the bearing portion 16 provided in the first housing 10 supports one end and the other end of the rotation shaft 41 in an axial center CL direction. The pedal pad 40 is fixed to a central portion of the rotation shaft 41.

Also in the fourth embodiment, the first housing 10 has an opening 15 in a part of the bottom wall. The opening 15 of the first housing 10 is closed by a second housing 20 made of a rigid portion 21. The second housing 20 has a spring receiving portion 27 for installing a coil spring 32. The second housing 20 supports a portion of the coil spring 32 of a reaction force generation mechanism 30 opposite to the pedal pad 40. Therefore, even when a high load is input from the reaction force generation mechanism 30, the amount of deformation of the second housing 20 is small.

In a pedal device 1 of the fourth embodiment described above, similarly to the first embodiment and the like, when a high load is input from the reaction force generation mechanism 30 to the second housing 20, transmission of the load from the second housing 20 to the first housing 10 is divided. Therefore, the first housing 10 is less susceptible to the load, which may be input from the reaction force generation mechanism 30 to the second housing 20. Therefore, by providing the bearing portion 16 in the first housing 10, the swinging movement of the pedal pad 40 is stabilized, and the reliability of the output signal of the sensor unit is improvable.

Further, in the manufacturing process of the pedal device 1, the rotation shaft 41 and the pedal pad 40 are assembled to the first housing 10, to form the first sub-assembly, while the second housing 20 and the reaction force generation mechanism 30 are assembled to form the second sub-assembly. Then, by assembling the first sub-assembly and the second sub-assembly, it becomes possible to easily assemble the pedal device 1, and the ease of assembly of the pedal device 1 is improvable.

Thus, the pedal device 1 of the fourth embodiment can also achieve the same effects as the first embodiment and the like from the corresponding configuration as the first embodiment and the like.

Fifth Embodiment

Figure 16:
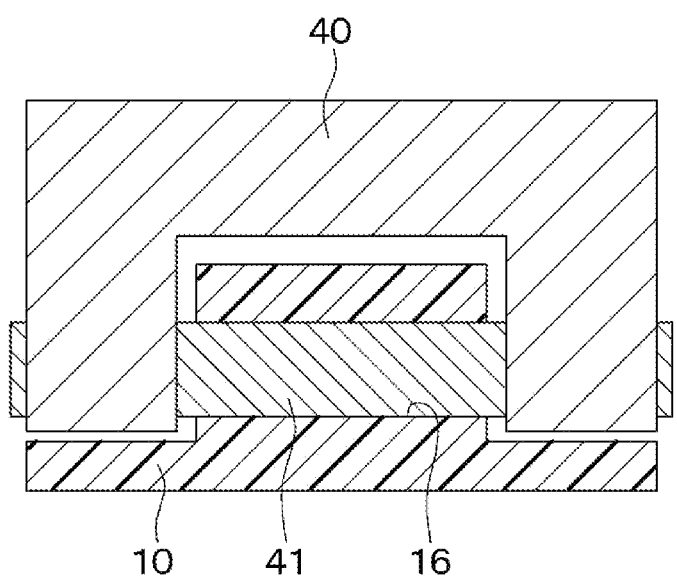
FIG. 16 is a sectional view showing a portion corresponding to FIG. 15 in a pedal device according to a fifth embodiment.

The fifth embodiment is a modification of the fourth embodiment. As shown in FIG. 16, in the fifth embodiment as well, a first housing 10 is provided with a bearing portion 16 that supports a rotation shaft 41 of a pedal pad 40. Specifically, the bearing portion 16 provided in a first housing 10 supports a central portion of the rotation shaft 41. The pedal pad 40 is fixed to the one end and the other end of the rotation shaft 41 in the axial center CL direction.

A pedal device 1 of the fifth embodiment achieves the same effects as the first embodiment and the like from the corresponding configuration as the first embodiment and the like.

Sixth Embodiment

Figure 17:
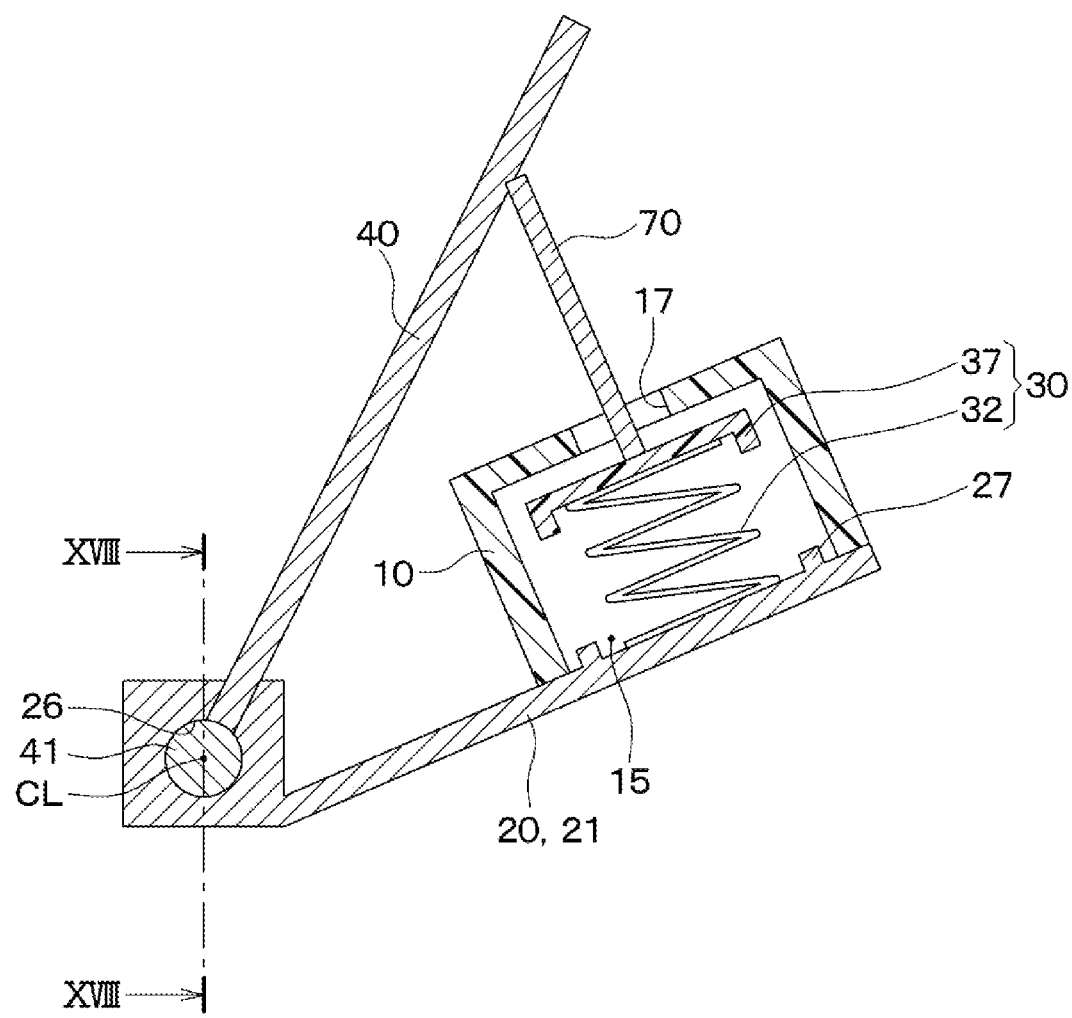
FIG. 17 is a cross-sectional view along a virtual plane perpendicular to a pivot axis of a pedal pad in a pedal device according to a sixth embodiment.
Figure 18:
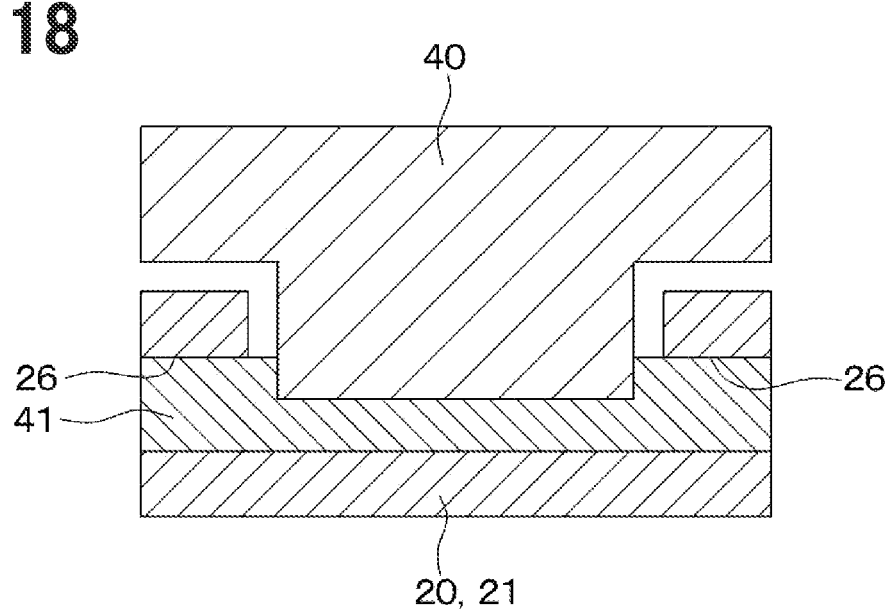
FIG. 18 is a cross-sectional view taken along line XVIII-XVIII in FIG. 17.

As shown in FIGS. 17 and 18, in the sixth embodiment, a second housing 20 is provided with a bearing portion 26 that supports a rotation shaft 41 of a pedal pad 40. Specifically, a bearing portion 26 provided in the second housing 20 supports one end and the other end of the rotation shaft 41 in the axial center CL direction. The pedal pad 40 is fixed to a central portion of the rotation shaft 41.

Further, the second housing 20 extends from the bearing portion 26 toward the front of the vehicle, and has a spring receiving portion 27 for installing a coil spring 32 in the middle thereof. The coil spring 32 is an example of an elastic member of a reaction force generation mechanism 30. That is, the second housing 20 supports a portion of the elastic member of the reaction force generation mechanism 30 on one side opposite to the pedal pad 40.

A first housing 10 covers the coil spring 32 as an elastic member of the reaction force generation mechanism 30 and an upper holder 37 provided at an upper end of the coil spring 32. The first housing 10 has a largest opening 15 on one side facing the vehicle body, on which a pedal device 1 is installed. Further, the largest opening 15 of the first housing 10 is configured to be closed by the second housing 20. Note that, in the sixth embodiment, the first housing 10 does not cover the bearing portion 26 and the rotation shaft 41.

The sixth embodiment described above also achieves the same effects as the first embodiment and the like from the corresponding configuration as the first embodiment and the like. Further, in the pedal device 1 of the sixth embodiment, the second housing 20 has the bearing portion 26, and supports a portion of the reaction force generation mechanism 30 opposite to the pedal pad 40. According to the above, it is possible to improve the positional accuracy of a distance between the swing axial center CL of the pedal pad 40 and the reaction force generation mechanism 30. Therefore, variations in the reaction force of the reaction force generation mechanism 30 due to assembly tolerances of the various members of the pedal device 1 are suppressible.

Seventh Embodiment

Figure 19:
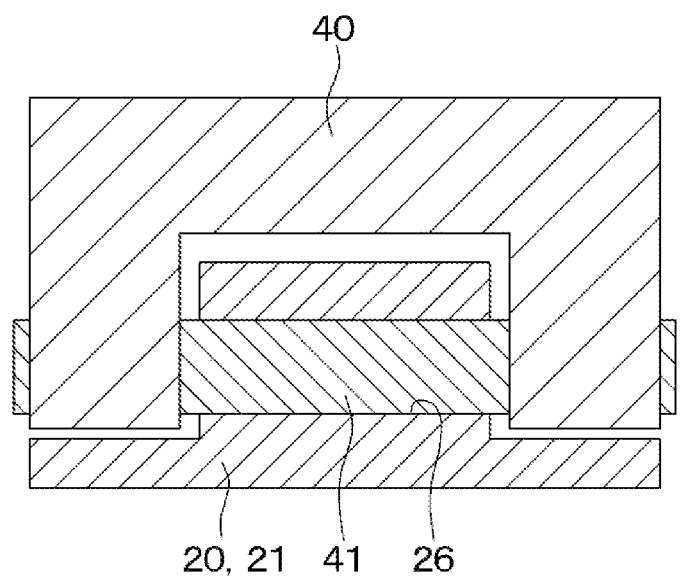
FIG. 19 is a sectional view showing a portion corresponding to FIG. 17 in a pedal device according to a seventh embodiment.

The seventh embodiment is a modification of the sixth embodiment. As shown in FIG. 19, in the seventh embodiment as well, a second housing 20 is provided with a bearing portion 26 that supports a rotation shaft 41 of a pedal pad 40. Specifically, the bearing portion 26 provided in the second housing 20 supports a central portion of the rotation shaft 41. The pedal pad 40 is fixed to the one end and the other end of the rotation shaft 41 in the axial center CL direction.

A pedal device 1 of the seventh embodiment can also achieve the same effects as the sixth embodiment and the like from the corresponding configuration as the sixth embodiment and the like.

Eighth Embodiment

Figure 20:
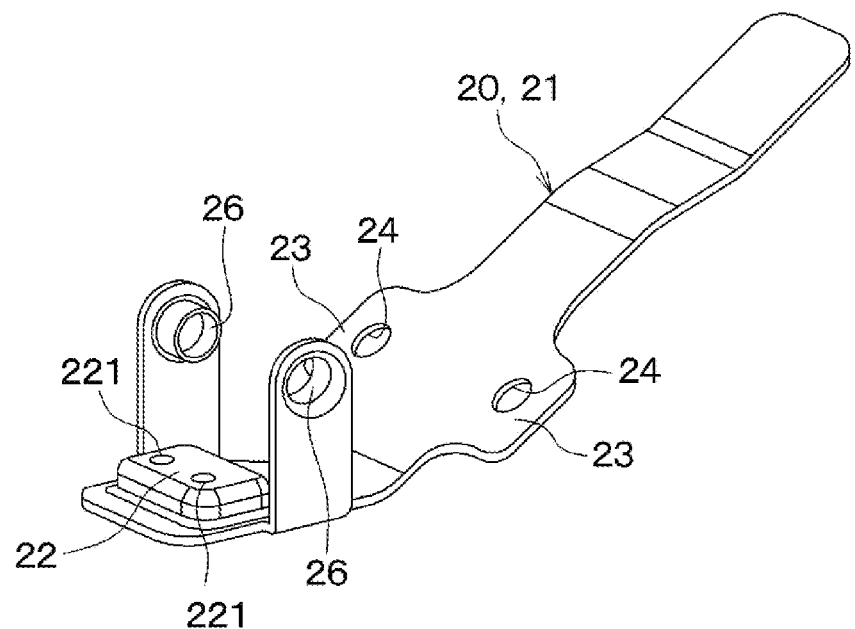
FIG. 20 is a perspective view of a second housing included in a pedal device according to an eighth embodiment.

The eighth embodiment is also a modification of the sixth embodiment. FIG. 20 shows only a second housing 20 included in a pedal device 1 of the eighth embodiment. The second housing 20 has a bearing portion 26 that supports a rotation shaft 41 of a pedal pad 40. Specifically, the bearing portion 26 provided in the second housing 20 is configured to support the one end and the other end of the rotation shaft 41 in the axial center CL direction.

Further, the second housing 20 has a portion 22 (i.e., a spring receiving portion 22) that supports a one end 311 of a leaf spring 31 that constitutes a reaction force generation mechanism 30. The spring receiving portion 22 is provided with a screw hole 221 for fixing the one end 311 of the leaf spring 31 with a bolt or the like. The leaf spring 31 is an example of an elastic member included in the reaction force generation mechanism 30. That is, the second housing 20 is configured to be capable of supporting a portion of the elastic member of the reaction force generation mechanism 30 opposite to the pedal pad 40.

Further, the second housing 20 extends from the spring receiving portion 22 toward the front of the vehicle, and has the portion 23 fixed to the vehicle body in a middle of such extension. The portion 23 fixed to the vehicle body extends respectively to a left side and a right side, and is provided with a hole 24 piercing in a plate thickness direction. The second housing 20 is fixed to a floor 2 or the dash panel of the vehicle by inserting a bolt (not shown) through the hole 24. The second housing 20 has one body construction in which the bearing portion 26, the spring receiving portion 22 that supports the reaction force generation mechanism 30, and the portion 23 fixed to the vehicle body are integrally formed by using the rigid portion 21.

The eighth embodiment described above also achieves the same effects as the sixth and seventh embodiments and the like from the corresponding configuration as the sixth and seventh embodiments and the like.

Ninth Embodiment

Figure 21:
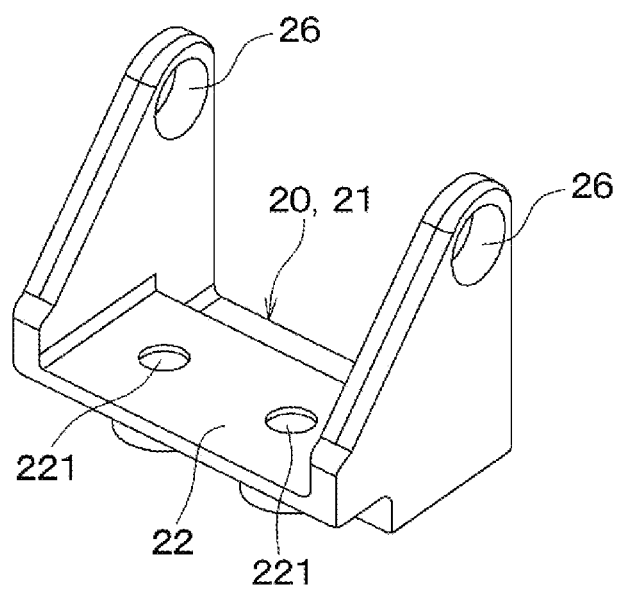
FIG. 21 is a perspective view of a second housing included in a pedal device according to a ninth embodiment.

Similarly to the above-described eighth embodiment, the ninth embodiment is also a modification of the sixth or seventh embodiment. FIG. 21 shows only a second housing 20 included in a pedal device 1 of the ninth embodiment. The second housing 20 has a bearing portion 26 that supports a rotation shaft 41 of a pedal pad 40.

Further, the second housing 20 has a spring receiving portion 22 for supporting a one end 311 of a leaf spring 31 described in the first embodiment, at a portion on a vehicle body side with respect to the bearing portion 26. The second housing 20 is configured to be capable of supporting a portion of an elastic member of the reaction force generation mechanism 30 opposite to the pedal pad 40.

The ninth embodiment described above can also achieve the same effects as the sixth to eighth embodiments and the like from the corresponding configuration as the sixth to eighth embodiments and the like.

Tenth Embodiment

Figure 22:
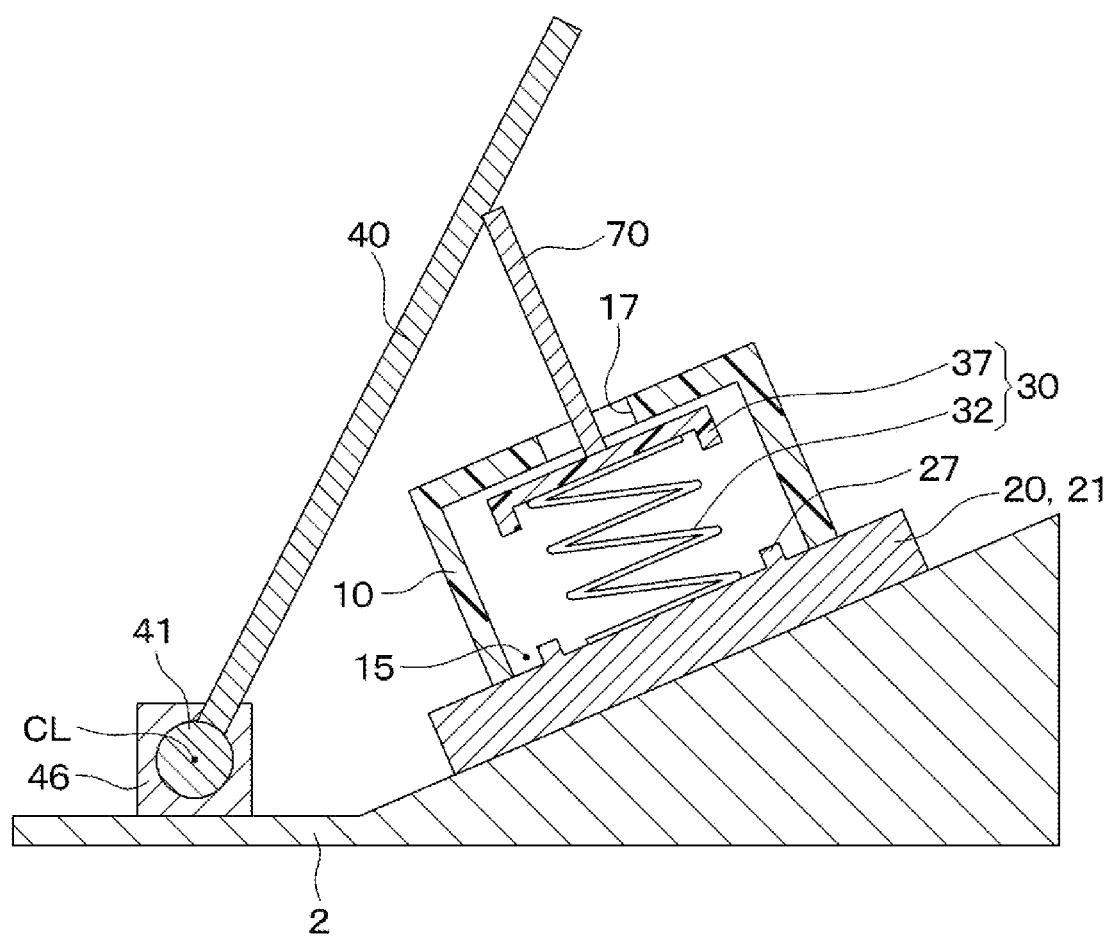
FIG. 22 is a cross-sectional view along a virtual plane perpendicular to a pivot axis of a pedal pad in a pedal device according to a tenth embodiment.

As shown in FIG. 22, in the tenth embodiment, a bearing member 46 that supports a rotation shaft 41 of a pedal pad 40 is configured to be directly attached to a floor 2 or the dash panel (that is, the vehicle body). A second housing 20 is configured to be attached to the floor 2 or the dash panel (that is, the vehicle body) at a position away from the bearing member 46. The second housing 20 has a spring receiving portion 27 for installing a coil spring 32. The coil spring 32 is an example of an elastic member of a reaction force generation mechanism 30. That is, the second housing 20 supports a portion of an elastic member of the reaction force generation mechanism 30 on one side opposite to the pedal pad 40.

A first housing 10 covers the coil spring 32 as an elastic member of the reaction force generation mechanism 30 and an upper holder 37 provided at an upper end of the coil spring 32. The first housing 10 has a largest opening 15 on one side facing the vehicle body, on which a pedal device 1 is installed. Further, the largest opening 15 of the first housing 10 is configured to be closed by the second housing 20.

The tenth embodiment described above also achieves the same effects as the first embodiment and the like from the corresponding configuration as the first embodiment and the like. Further, the pedal device 1 of the tenth embodiment is configured to simplify the configurations of the first housing 10 and the second housing 20.

Eleventh to Twelfth Embodiments

In the eleventh to twelfth embodiments described below, part of the configuration of the second housing 20 is changed with respect to the fourth embodiment or the like, and other configurations are the same as those of the fourth embodiment, or the like. Therefore, only the part different from the fourth embodiment or the like is described.

Eleventh Embodiment

Figure 23:
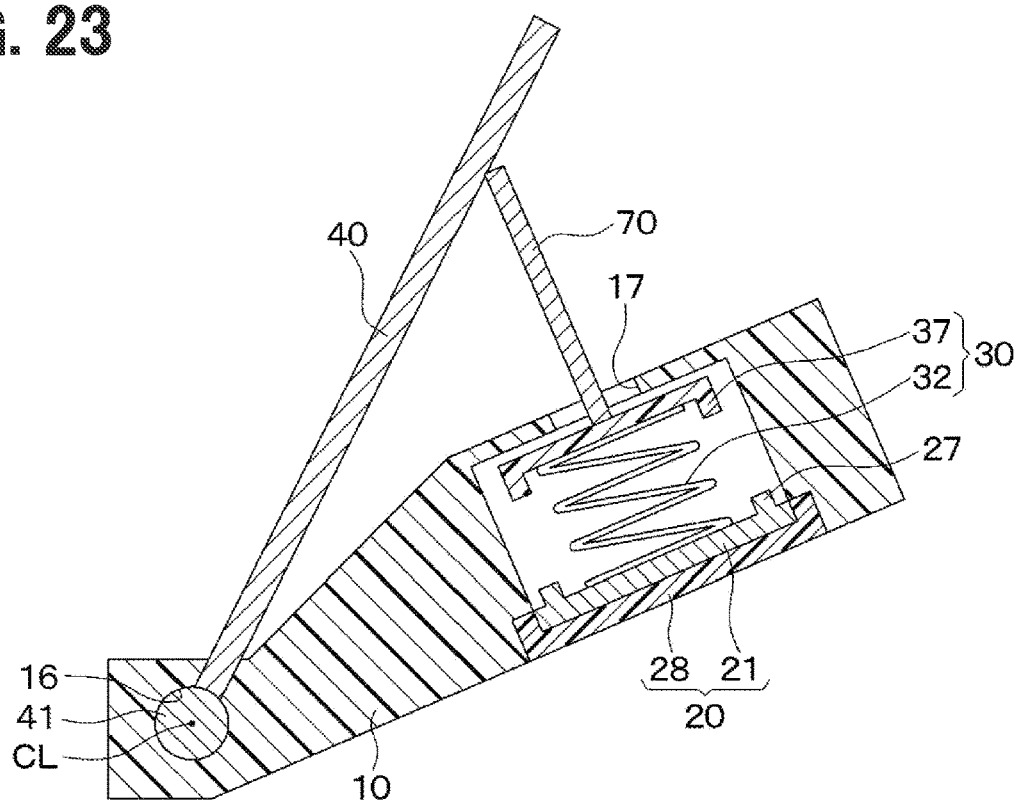
FIG. 23 is a sectional view along a virtual plane perpendicular to a pivot axis of a pedal pad in a pedal device according to an eleventh embodiment.

As shown in FIG. 23, a second housing 20 included in a pedal device 1 of the eleventh embodiment has a rigid portion 21 having a Young's modulus greater than that of a first housing 10 and a resin portion 28 for molding the rigid portion 21. The rigid portion 21 and the resin portion 28 of the second housing 20 are integrally formed by insert molding.

The rigid portion 21 of the second housing 20 is arranged at a position between a portion of a reaction force generation mechanism 30 opposite to a pedal pad 40, and the vehicle body. In the eleventh embodiment, the second housing 20 has (i) the rigid portion 21 arranged on one side facing the reaction force generation mechanism 30 and (ii) the resin portion 28 arranged on the other side facing the vehicle body. A spring receiving portion 27 for installing a coil spring 32 is provided on the rigid portion 21. The coil spring 32 is an example of an elastic member of the reaction force generation mechanism 30. That is, the rigid portion 21 of the second housing 20 supports a portion of an elastic member of the reaction force generation mechanism 30 opposite to the pedal pad 40.

The eleventh embodiment described above also achieves the same effects as the first embodiment or the like from the corresponding configuration as the first embodiment or the like. Further, the second housing 20 included in the pedal device 1 of the eleventh embodiment has the rigid portion 21 at least in part, and a portion of the reaction force generation mechanism 30 opposite to the pedal pad 40 is configured to be supported by the rigid portion 21. Therefore, even when a driver applies a pedaling force to the pedal pad 40, and a high load is input to the rigid portion 21 from the reaction force generation mechanism 30, the amount of deformation of the rigid portion 21 is small. Thus, the reaction force generation mechanism 30 can generate a stable reaction force to the pedal pad 40. In such manner, the pedal device 1 stabilizes the pedaling force characteristics and reduces the weight of the pedal device 1, by adding the required-minimum members such as the rigid portion 21 to the portion 22 that supports the reaction force generation mechanism 30, thereby minimizing the increase of the weight of the pedal device 1 for realizing the weight reduction.

Twelfth Embodiment

Figure 24:
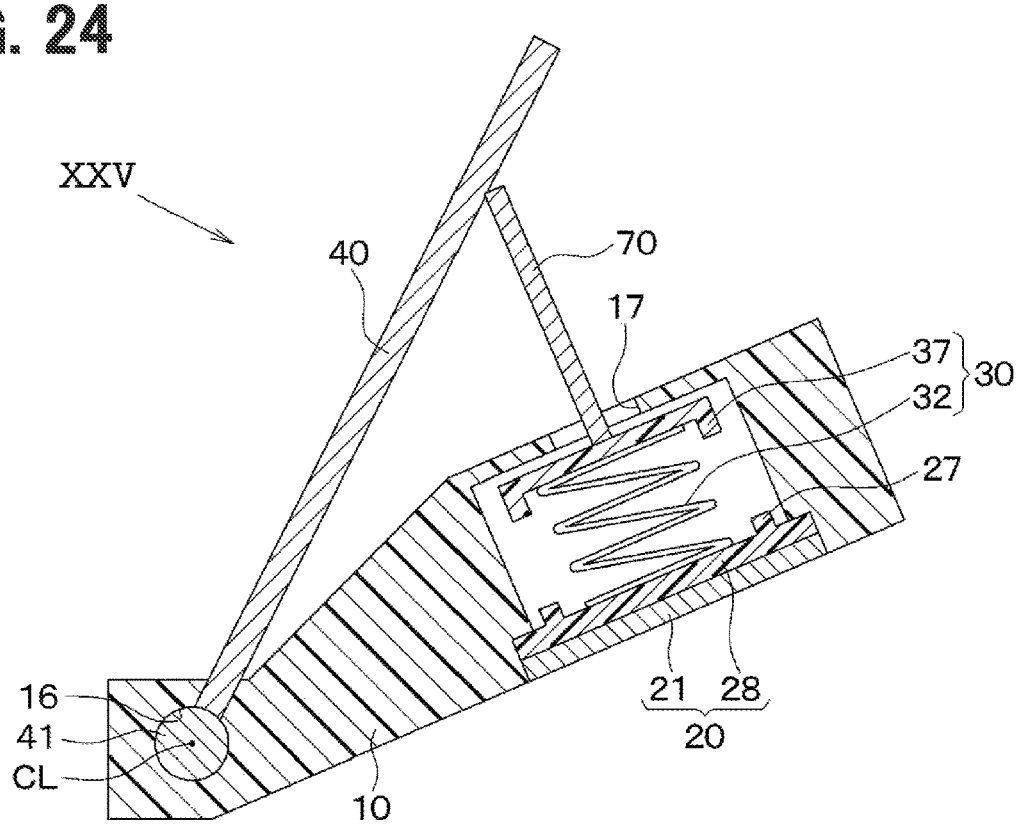
FIG. 24 is a sectional view along a virtual plane perpendicular to a pivot axis of a pedal pad in a pedal device according to a twelfth embodiment.

As shown in FIG. 24, a second housing 20 included in a pedal device 1 of the twelfth embodiment also has a rigid portion 21 and a resin portion 28. The rigid portion 21 and the resin portion 28 of the second housing 20 are integrally formed by insert molding.

The rigid portion 21 of the second housing 20 is arranged at a position between a portion of a reaction force generation mechanism 30 opposite to a pedal pad 40, and a vehicle body. In the twelfth embodiment, the second housing 20 has (i) the resin portion 28 arranged on one side facing a reaction force generation mechanism 30 and (ii) the rigid portion 21 arranged on the other side facing the vehicle body. A spring receiving portion 27 for installing a coil spring 32 is provided on the resin portion 28. The coil spring 32 is an example of an elastic member that is provided in the reaction force generation mechanism 30. The rigid portion 21 of the second housing 20 is arranged on a vehicle body side of the spring receiving portion 27 provided in the resin portion 28. With such configuration, the rigid portion 21 of the second housing 20 supports a portion of an elastic member of the reaction force generation mechanism 30 opposite to the pedal pad 40.

Figure 25:
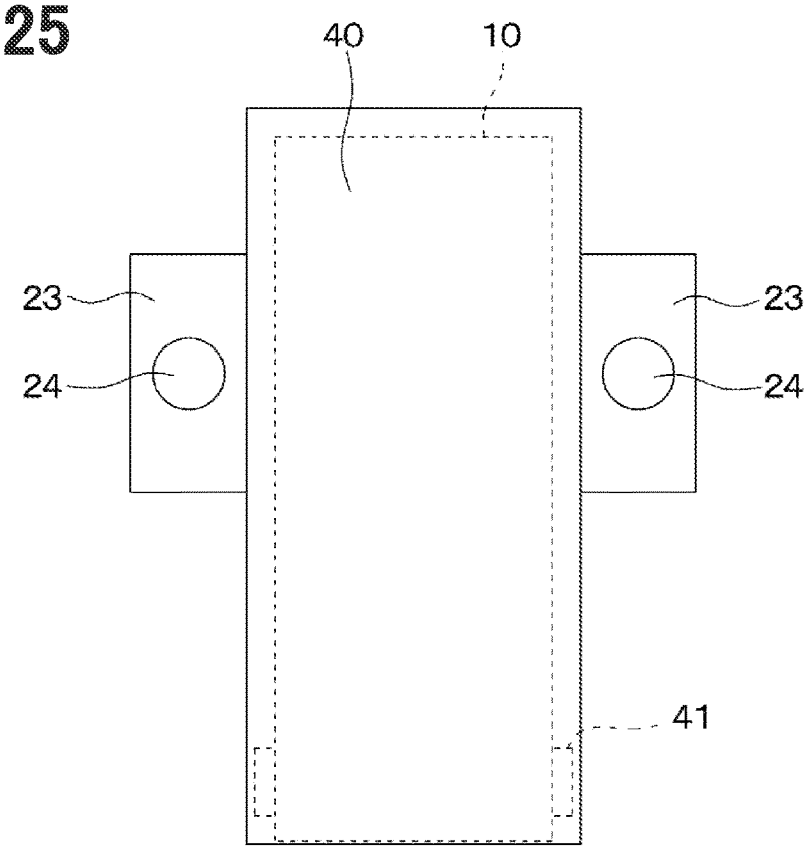
FIG. 25 is a diagram when being viewed in an XXV direction of FIG. 24.

As shown in FIG. 25, the rigid portion 21 of the second housing 20 integrally has a portion 23 fixed to the vehicle body, in addition to a portion (that is, the spring receiving portion 27) that supports the reaction force generation mechanism 30. The rigid portion 21 of the second housing 21 is formed as one integrated body of (i) the portion supporting the reaction force generation mechanism 30 (that is, a portion provided on a vehicle side with respect to the spring receiving portion 27) and (ii) a portion 23 that is fixed to the vehicle body. The portion 23 fixed to the vehicle body extends respectively to the left and right sides of a first housing 10, and is provided with a hole 24 piercing in a plate thickness direction The second housing 20 is fixed to a floor 2 or the dash panel of the vehicle by inserting a bolt (not shown) through the hole 24.

The twelfth embodiment described above also achieves the same effects as the first embodiment and the like from the corresponding configuration as the first embodiment and the like. Further, the second housing 20 included in the pedal device 1 of the twelfth embodiment also has the configuration, in which the rigid portion 21 is provided at least in part, and the portion of the reaction force generation mechanism 30 opposite to the pedal pad 40 is supported by the rigid portion 21. Therefore, the pedal device 1 of the twelfth embodiment also achieves the same effects as those of the eleventh embodiment.

Thirteenth to Twenty-Second Embodiments

The thirteenth to twenty-second embodiments described in the following respectively show a method of fixing a first housing 10 and a second housing 20 in contrast to the method in the first embodiment and the like, and the rest of the configuration is the same as the first embodiment and the like. Specifically, the thirteenth to fifteenth embodiments are examples of fixing methods using bolts 60 as fixing members. The sixteenth to eighteenth embodiments are examples of fixing methods by snap-fitting. The nineteenth embodiment is an example of a fixing method by caulking. The twentieth to twenty-second embodiments are examples in which a positioning structure is added to those fixing methods.

Thirteenth Embodiment

Figure 26:
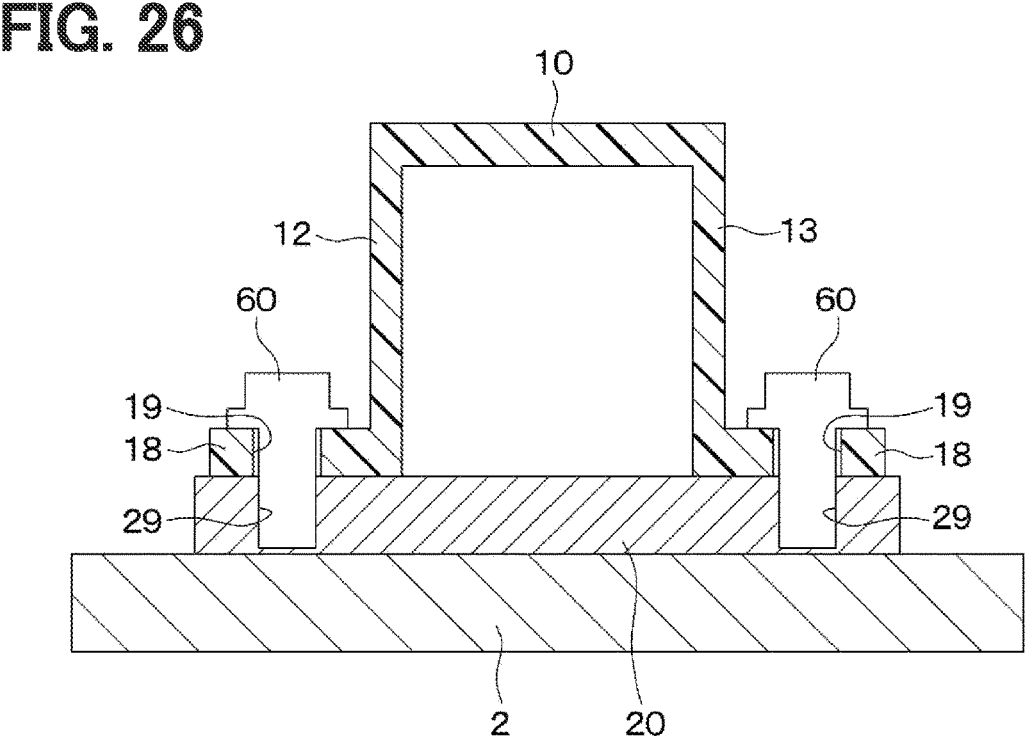
FIG. 26 is a cross-sectional view showing a method of fixing a first housing and a second housing in a pedal device according to a thirteenth embodiment.

As shown in FIG. 26, a first housing 10 included in a pedal device 1 of the thirteenth embodiment has flange portions 18 respectively extending outward from portions of a left side wall 12 and a right side wall 13 on a second housing 20 side. The flange portion 18 is provided with a hole 19 piercing in a plate thickness direction. On the other hand, a second housing 20 is provided with a screw hole 29 at positions corresponding to the holes 19 of the flange portions 18. A female screw is provided on an inner wall of a screw hole 29. A bolt 60 as a fixing member is inserted through the hole 19 of the flange portion 18 from the outside of the first housing 10 and screwed into the screw hole 29 of the second housing 20. With such configuration, the first housing 10 and the second housing 20 are fixed.

In the thirteenth embodiment described above, the bolt 60 as a fixing member is arranged at a position visible from an occupant when the pedal device 1 is in an attached state to the vehicle body. Therefore, the bolt 60 is removable while the pedal device 1 is attached to the vehicle body, and the first housing 10 and the second housing 20 can be disassembled as required.

Fourteenth Embodiment

Figure 27:
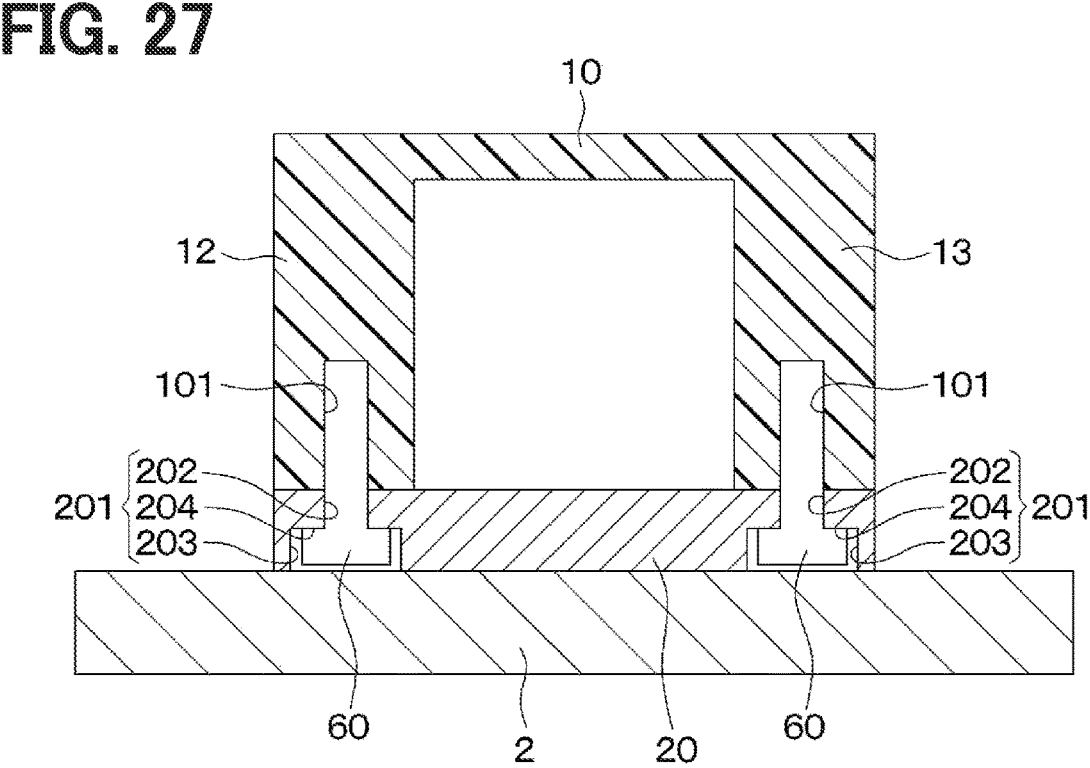
FIG. 27 is a cross-sectional view showing a method of fixing a first housing and a second housing in a pedal device according to a fourteenth embodiment.

As shown in FIG. 27, a first housing 10 included in a pedal device 1 of the fourteenth embodiment has a threaded hole 101 opening toward a second housing 20 in a left side wall 12 and a right side wall 13 of the first housing 10. A female screw is provided on an inner wall of the threaded hole 101. On the other hand, the second housing 20 is provided with a hole portion 201 piercing in a plate thickness direction at a position corresponding to the threaded hole 101 of the first housing 10. The hole portion 201 provided in the second housing 20 is made of a small-diameter hole 202 on a first housing 10 side and a large-diameter hole 203 on a vehicle body side. The small-diameter hole 202 is sized to allow a shaft of a bolt 60 as a fixing member to pass through, and the large-diameter hole 203 is sized to accommodate a head of the bolt 60. A step surface 204 is provided at a position between the small-diameter hole 202 and the large-diameter hole 203.

The bolt 60 as a fixing member is screwed into the threaded hole 101 of the first housing 10, after passing through the large-diameter hole 203 and the small-diameter hole 202 from the outside of the second housing 20. The head of the bolt 60 abuts on the step surface 204 while being accommodated in the large-diameter hole 203. With such configuration, the first housing 10 and the second housing 20 are fixed.

In the fourteenth embodiment described above, the bolt 60 as a fixing member is arranged at a position invisible to the occupant when the pedal device 1 is attached to the vehicle body. Therefore, the bolt 60 cannot be removed while the pedal device 1 is attached to the vehicle body. Therefore, this pedal device 1 is prevented from being unnecessarily disassembled.

Fifteenth Embodiment

Figure 28:
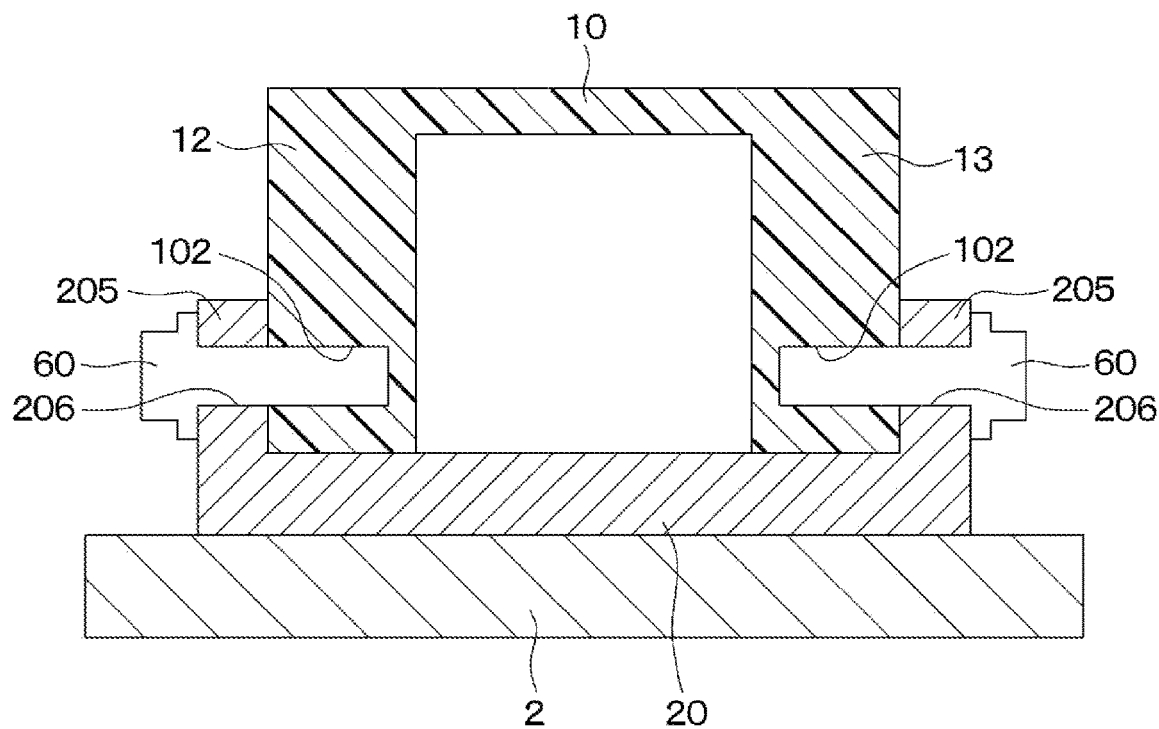
FIG. 28 is a sectional view showing a method of fixing a first housing and a second housing in a pedal device according to a fifteenth embodiment.

As shown in FIG. 28, a second housing 20 provided in a pedal device 1 of the fifteenth embodiment has an upright wall portion 205 that extends upright from an extended portion extending outward from a first housing 10 along a left side wall 12 and a right side wall 13 of the first housing 10. A hole 206 piercing through the upright wall portion 205 to reach the first housing 10 is provided in the upright wall portion 205. On the other hand, the left side wall 12 and the right side wall 13 of the first housing 10 are respectively provided with a screw hole 102 at a position corresponding to the hole 206 of the upright wall portion 205. A female thread is provided on an inner wall of a screw hole 102. A bolt 60 as a fixing member is inserted through the hole 206 of the upright wall portion 205 from the outside of the upright wall portion 205, and is screwed into the screw hole 102 of the first housing 10. With such configuration, the first housing 10 and the second housing 20 are fixed.

In the fifteenth embodiment described above, in a state in which a pedal device 1 attached to a vehicle body, the bolt 60 as a fixing member is arranged at a position visible to the occupant. Therefore, the bolt 60 is removable while the pedal device 1 is attached to the vehicle body, and the first housing 10 and the second housing 20 can be disassembled as required.

Sixteenth Embodiment

Figure 29:
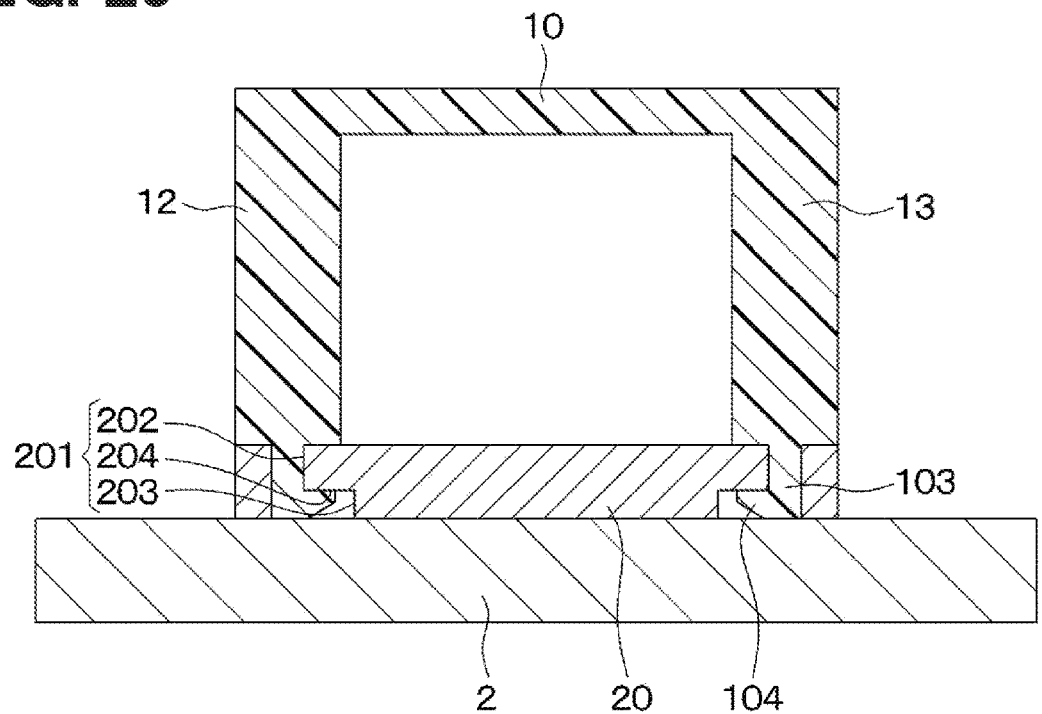
FIG. 29 is a cross-sectional view showing a method of fixing a first housing and a second housing in a pedal device according to a sixteenth embodiment.

As shown in FIG. 29, a first housing 10 provided in a pedal device 1 of the sixteenth embodiment has a locking claw 103 for snap fitting, which protrudes, toward a second housing 20, from a surface of a left side wall 12 and a right side wall 13 facing the second housing 20. A tip protrusion 104 is provided at a tip of the locking claw 103 and protrudes in a direction intersecting a facing direction in which the first housing 10 and the second housing 20 face each other.

On the other hand, the second housing 20 is provided with the hole portion 201 piercing in a plate thickness direction at a position corresponding to the locking claw 103 of the first housing 10. The hole portion 201 provided in the second housing 20 is made of a small-diameter hole 202 on a first housing 10 side and a large-diameter hole 203 on a vehicle body side. The small-diameter hole 202 is sized to allow the locking claw 103 to pass through, and the large-diameter hole 203 is sized to accommodate the tip protrusion 104 of the locking claw 103. A step surface 204 is provided at a position between the small-diameter hole 202 and the large-diameter hole 203.

Further, the locking claw 103 protruding from the first housing 10 passes through the large-diameter hole 203 from the small-diameter hole 202 of the second housing 20, and the tip protrusion 104 of the locking claw 103 engages with the step surface 204 in an accommodated state in the large-diameter hole 203. With such configuration, the first housing 10 and the second housing 20 are fixed.

In the sixteenth embodiment described above, by adopting a snap fitting to fix the first housing 10 and the second housing 20, assemblability is improvable. Further, in the sixteenth embodiment, the snap-fitting locking claw 103 is arranged at a position invisible to the occupant when the pedal device 1 is attached to the vehicle body. Therefore, the snap fitting cannot be released while the pedal device 1 is attached to the vehicle body. Thus, the pedal device 1 is prevented from being unnecessarily disassembled.

Seventeenth Embodiment

Figure 30:
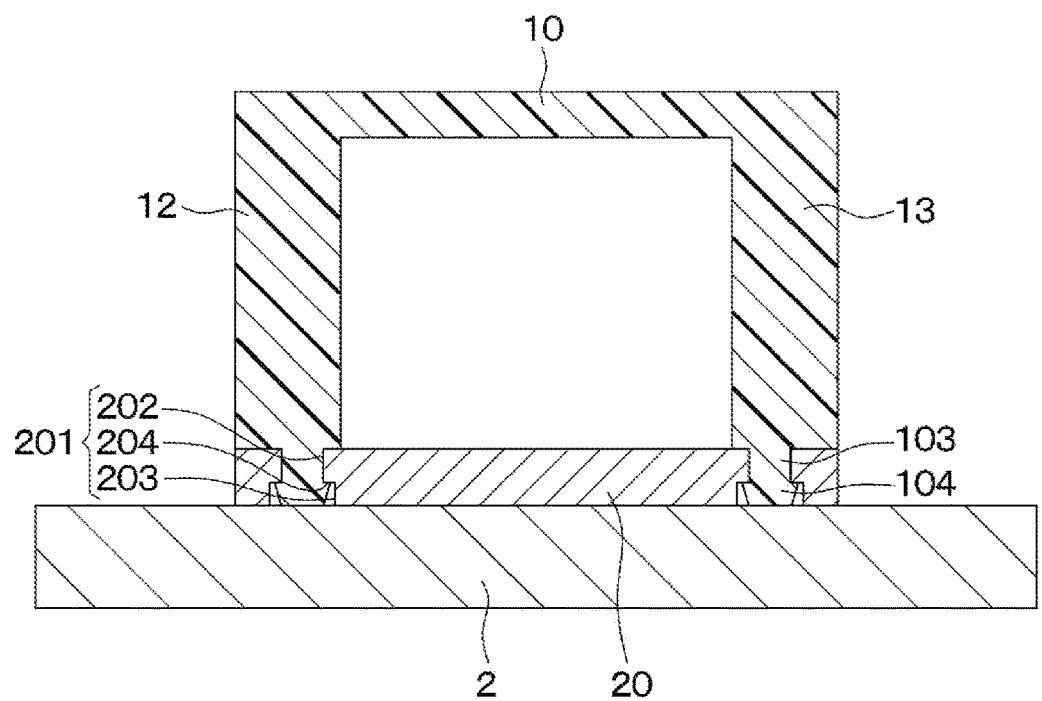
FIG. 30 is a cross-sectional view showing a method of fixing a first housing and a second housing in a pedal device according to a seventeenth embodiment.

The seventeenth embodiment is a modification of the sixteenth embodiment. As shown in FIG. 30, a first housing 10 included in a pedal device 1 of the seventeenth embodiment also has a locking claw 103 for snap fitting. In the seventeenth embodiment, a tip protrusion 104 is provided substantially on the entire circumference of the locking claw 103.

In the seventeenth embodiment, the locking claw 103 protruding from the first housing 10 passes through a large-diameter hole 203 from a small-diameter hole 202 of a second housing 20, and the tip protrusion 104 of the locking claw 103 engages with a step surface 204 in a state in which the tip protrusion 104 is housed in the large-diameter hole 203. With such configuration, the first housing 10 and the second housing 20 are fixed.

The seventeenth embodiment described above can thus have the effects similar to those of the sixteenth embodiment.

Eighteenth embodiment

Figure 31:
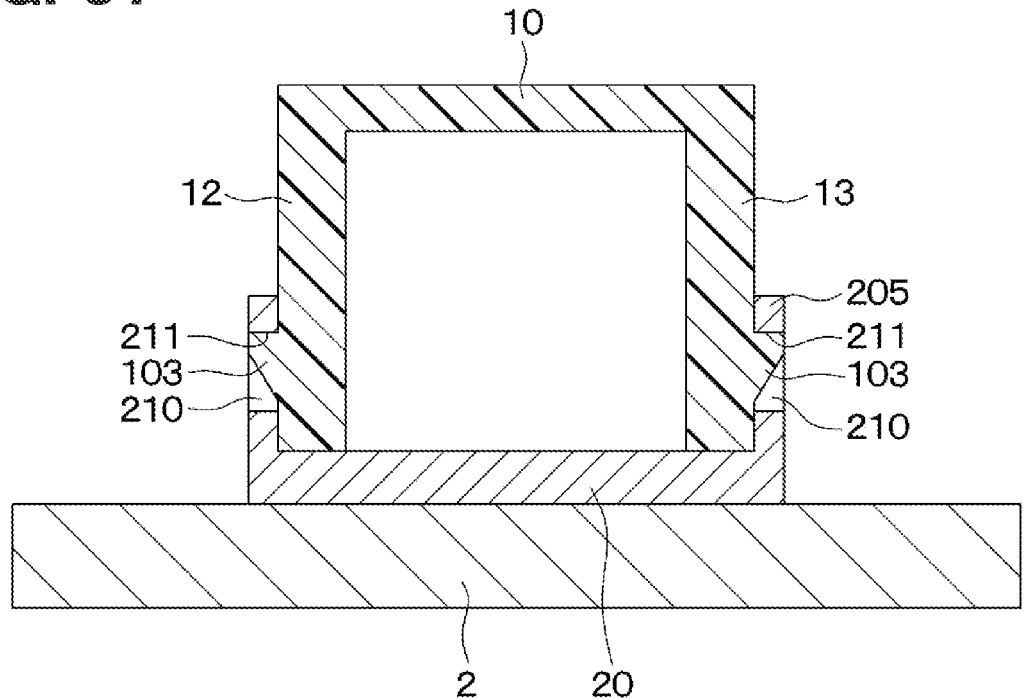
FIG. 31 is a sectional view showing a method of fixing a first housing and a second housing in a pedal device according to an eighteenth embodiment.

As shown in FIG. 31, a first housing 10 provided in a pedal device 1 of the eighteenth embodiment has a locking claw 103 for snap fitting, which protrudes outward in the middle of a left side wall 12 and a right side wall 13. The locking claw 103 has an inclined shape in which the thickness gradually increases as the claw 103 recedes away from a second housing 20. On the other hand, the second housing 20 has an upright wall portion 205 that rises along the left side wall 12 and the right side wall 13 of the first housing 10 from a portion that extends outward than the first housing 10. A hole 210 for locking the locking claw 103 is provided at a portion of the upright wall portion 205 corresponding to the locking claw 103 of the first housing 10.

The locking claw 103 protruding from the left side wall 12 and the right side wall 13 of the first housing 10 engages with the hole 210 provided in the upright wall portion 205 of the second housing 20, and is locked to a portion of an inner wall surface 211 of the hole 210 on one side opposite to the vehicle body. With such configuration, the first housing 10 and the second housing 20 are fixed.

In the eighteenth embodiment described above, by adopting a snap fitting to fix the first housing 10 and the second housing 20 together, assemblability is improvable. Further, in the eighteenth embodiment, when the pedal device 1 is attached to the vehicle body, the locking claw 103 for snap-fitting is configured to be arranged at a position visible to the occupant. Therefore, the snap-fitted locking claw 103 is releasable in a state that the pedal device 1 is attached to the vehicle body, thereby allowing in such state to disassemble the first housing 10 and the second housing 20 as required.

Nineteenth Embodiment

Figure 32:
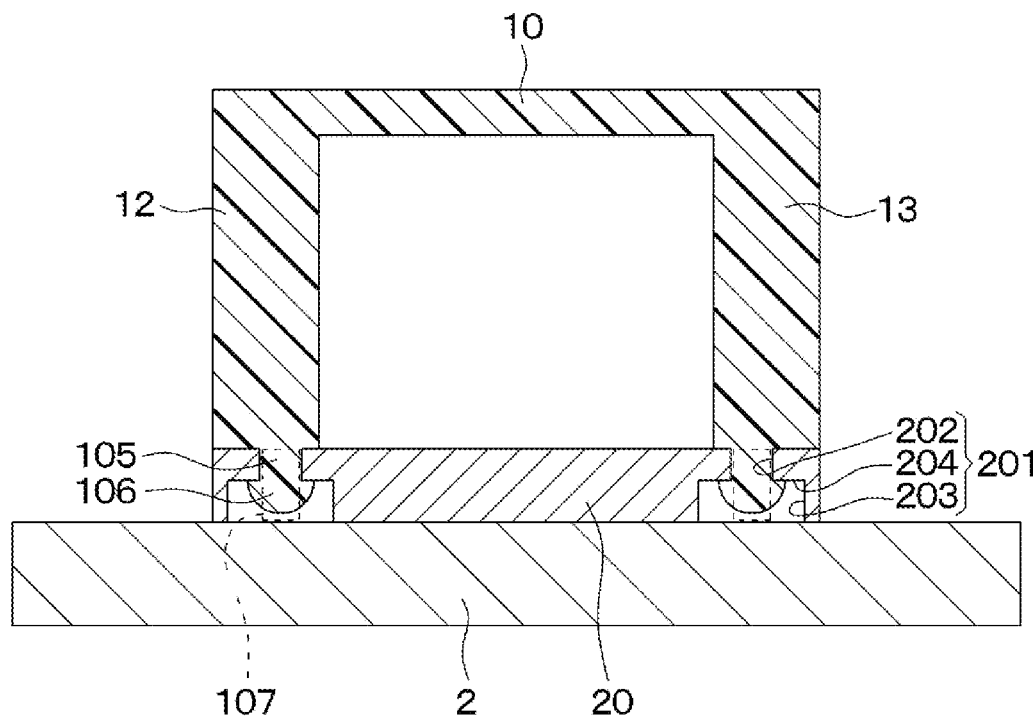
FIG. 32 is a sectional view showing a method of fixing a first housing and a second housing in a pedal device according to a nineteenth embodiment.

In the nineteenth embodiment, a first housing 10 and a second housing 20 are fixed by caulking. As shown in FIG. 32, the first housing 10 provided in a pedal device 1 of the nineteenth embodiment has a column portion 105 and a large-diameter portion 106 protruding toward the second housing 20 from a surface of a left side wall 12 and a right side wall 13 facing the second housing 20. The first housing 10, the column portion 105, and the large-diameter portion 106 are integrally formed of a continuous material. Also, the large-diameter portion 106 is formed to be greater than the column portion 105. As indicated by a broken line 107 in FIG. 32, the column portion 105 and the large-diameter portion 106 have the same size before the first housing 10 and the second housing 20 are fixed. When fixing the first housing 10 and the second housing 20 together, the large-diameter portion 106 is processed and formed by thermal caulking to be greater than the column portion 105.

On the other hand, the second housing 20 is provided with a hole portion 201 piercing in a plate thickness direction of the second housing 20 at a position corresponding to the column portion 105 and the large-diameter portion 106 of the first housing 10. The hole portion 201 provided in the second housing 20 is made of a small-diameter hole 202 on a first housing 10 side and a large-diameter hole 203 on a vehicle body side. The small-diameter hole 202 is sized to allow the column portion 105 to pass through, and the large-diameter hole 203 is sized to accommodate the large-diameter portion 106. A step surface 204 is provided at a position between the small-diameter hole 202 and the large-diameter hole 203.

When assembling the first housing 10 and the second housing 20, a protrusion indicated by the dashed line 107 in FIG. 32 is inserted through the hole portion 201 provided in the second housing 20. Then, the large-diameter portion 106 is formed by performing thermal caulking such that the tip of the projection is heated and crushed. Thereby, the first housing 10 and the second housing 20 are caulked and fixed.

In the nineteenth embodiment described above, the first housing 10 and the second housing 20 are fixed by thermal caulking. Therefore, the first housing 10 and the second housing 20 cannot be disassembled unless at least the large-diameter portion 106 is cut. Further, in the nineteenth embodiment, when the pedal device 1 is attached to the vehicle body, the column portion 105 and the large-diameter portion 106 protruding from the first housing 10 are arranged at positions invisible to the occupant. Therefore, this pedal device 1 is prevented from being unnecessarily disassembled.

Note that, as a modification of the nineteenth embodiment, although not shown in the drawing, the second housing 20 may be provided with a column portion and a large-diameter portion, and the second housing 20 and the first housing 10 may be fixed by caulking, by providing the first housing 10 with a hole portion.

Twentieth Embodiment

Figure 33:
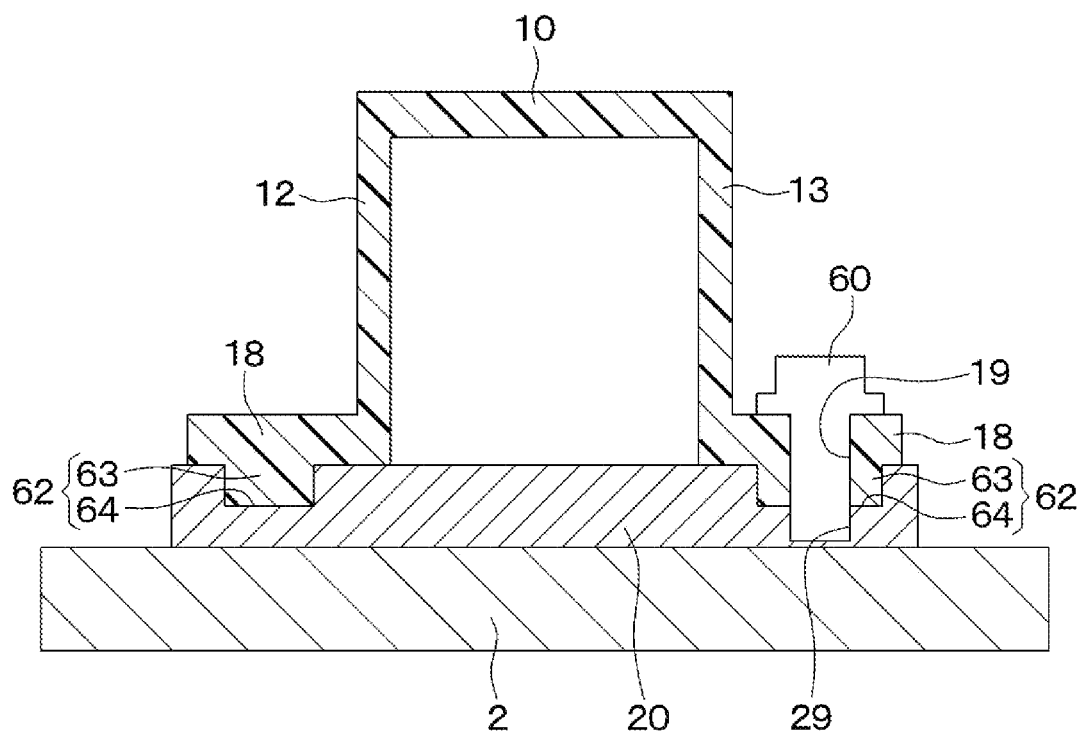
FIG. 33 is a cross-sectional view showing a fixing method and a positioning structure between a first housing and a second housing in a pedal device according to a twentieth embodiment.

The twentieth embodiment is an example in which a positioning structure is added to the fixing method described in the thirteenth embodiment. As shown in FIG. 33, a positioning structure 62 provided in a pedal device 1 of the twentieth embodiment includes a first positioning portion 63 provided on a flange portion 18 of a first housing 10 and a second positioning portion 64 provided on a second housing 20. In the twentieth embodiment, the first positioning portion 63 is a convex portion protruding from the flange portion 18 of the first housing 10 toward the second housing 20. On the other hand, the second positioning portion 64 is a concave portion provided in the second housing 20 at a position corresponding to the first positioning portion 63. By the engagement of the convex portion as the first positioning portion 63 and the concave portion as the second positioning portion 64, an assembly position of the first housing 10 and the second housing 20 is determined with high accuracy. The positioning structure 62 may be provided at the same position where a bolt 60 serving as the fixing member is attached, or may be provided at a position different from where the bolt 60 is attached.

Figure 34:
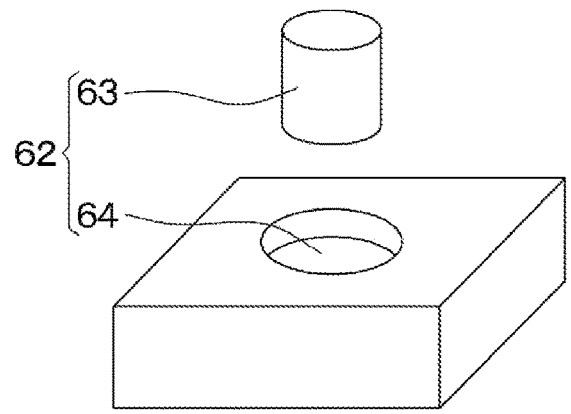
FIG. 34 is a diagram showing an example of a positioning structure between the first housing and the second housing in the pedal device according to the twentieth embodiment.
Figure 35:
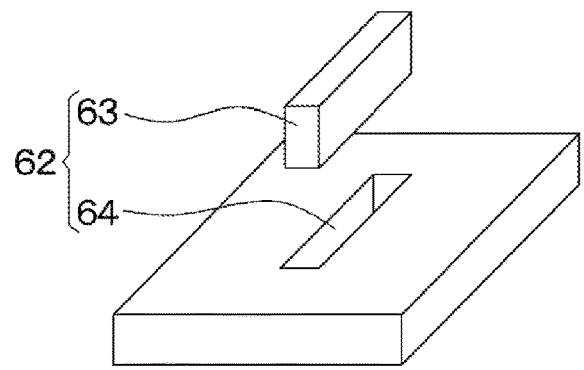
FIG. 35 is a view showing another example of a positioning structure between the first housing and the second housing in the pedal device according to the twentieth embodiment.
Figure 36:
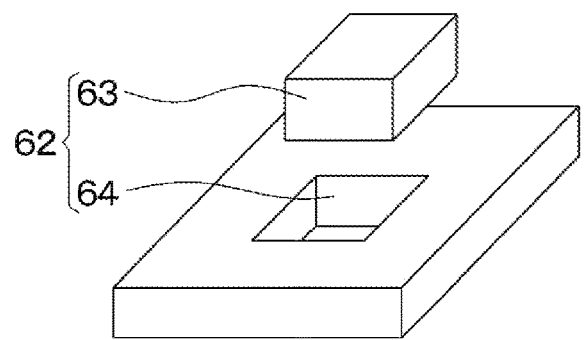
FIG. 36 is a view showing still another example of a positioning structure between the first housing and the second housing in the pedal device according to the twentieth embodiment.

FIGS. 34 to 36 show examples of the shapes of the first positioning portion 63 and the second positioning portion 64 that constitute the positioning structure 62. As shown in FIG. 34, the first positioning portion 63 may be columnar, and the second positioning portion 64 may correspondingly be cylindrical. As shown in FIGS. 35 and 36, the first positioning portion 63 may be shaped like a square pole, and the second positioning portion 64 may be shaped like a corresponding rectangular tube. Although illustration is omitted, various configurations such as pins or ribs can be adopted as the convex portion forming the positioning structure 62, and various configurations such as grooves or holes can be adopted as the concave portion forming the positioning structure 62.

In the twentieth embodiment described above, the assembly positions of the first housing 10 and the second housing 20 are accurately determined by the positioning structure 62. According to the above, the pedal device 1 is provided with the positioning structure 62, thereby having an improved accuracy for the assembly positioning for assembling the first housing 10 and the second housing 20, compared with the assembling of the first housing 10 and the second housing 20 only with the bolt 60.

In the twentieth embodiment, the first housing 10 and the second housing 20 are fixed by using the bolts 60. However, the fixing method is not limited to the above, and other methods such as snap-fitting, caulking, or the like may also be used.

Twenty-First Embodiment

Figure 37:
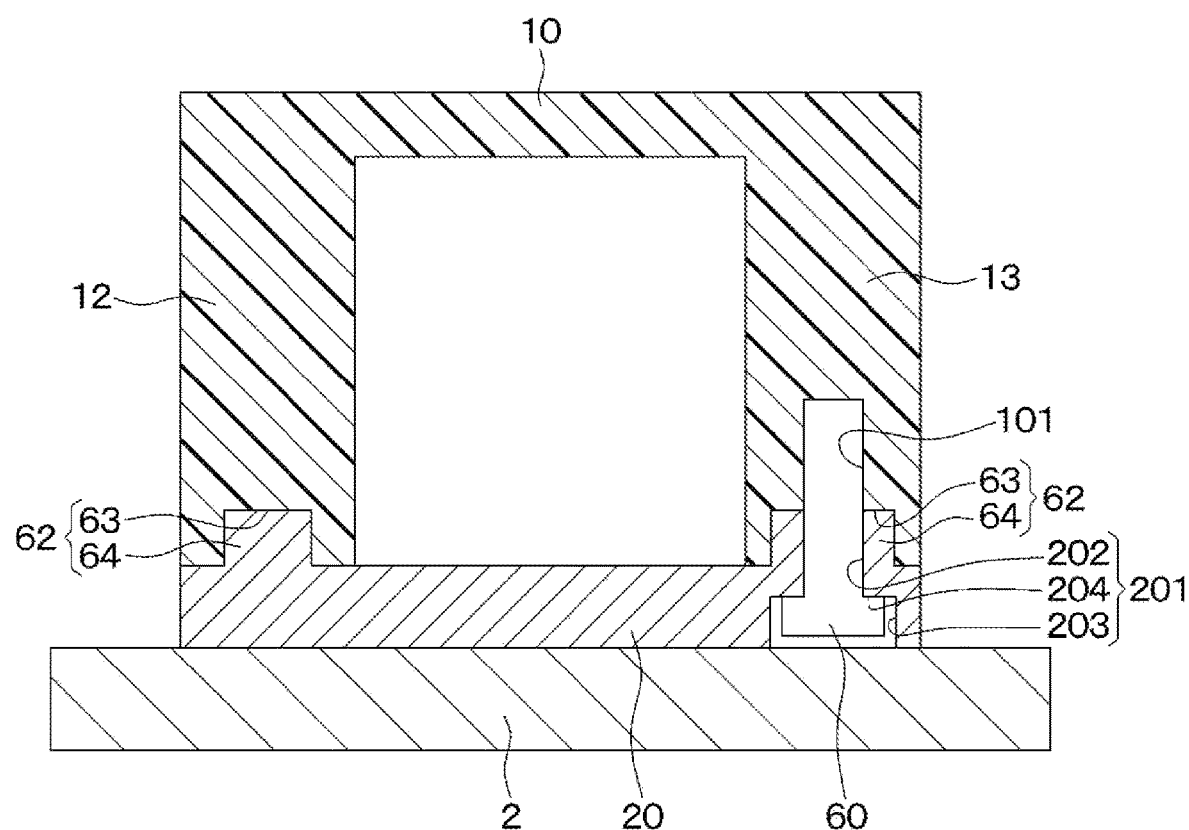
FIG. 37 is a cross-sectional view showing a fixing method and a positioning structure between a first housing and a second housing in a pedal device according to a twenty-first embodiment.

As shown in FIG. 37, the twenty-first embodiment is an example in which a positioning structure 62 is added to the fixing method described in the fourteenth embodiment.

Also, the positioning structure 62 described in the twenty-first embodiment is a modification of the positioning structure 62 described in the twentieth embodiment. The positioning structure 62 provided in a pedal device 1 of the twenty-first embodiment includes a first positioning portion 63 provided on a first housing 10 and a second positioning portion 64 provided on a second housing 20. In the twenty-first embodiment, the first positioning portion 63 is a concave portion provided in the first housing 10. On the other hand, the second positioning portion 64 is a convex portion provided on the second housing 20 at a position corresponding to the first positioning portion 63. By the engagement of the concave portion as the first positioning portion 63 and the convex portion as the second positioning portion 64, the assembly position of the first housing 10 and the second housing 20 is determined with high accuracy. The positioning structure 62 may be provided at the same position where a bolt 60 serving as the fixing member is attached, or may be provided at a position different from the position where the bolt 60 is attached.

In the twenty-first embodiment described above, the assembly position of the first housing 10 and the second housing 20 is accurately determined by the positioning structure 62. According to the above, the pedal device 1 is provided with the positioning structure 62, thereby having an improved accuracy for the assembly positioning for assembling the first housing 10 and the second housing 20, compared with the assembling of the first housing 10 and the second housing 20 only with the bolt 60.

In the twenty-first embodiment, the bolt 60 is used as a fixing member in the method of fixing the first housing 10 and the second housing 20. However, the method is not limited to the above, and snap-fitting, caulking, or the like may also be used.

Twenty-Second Embodiment

Figure 38:
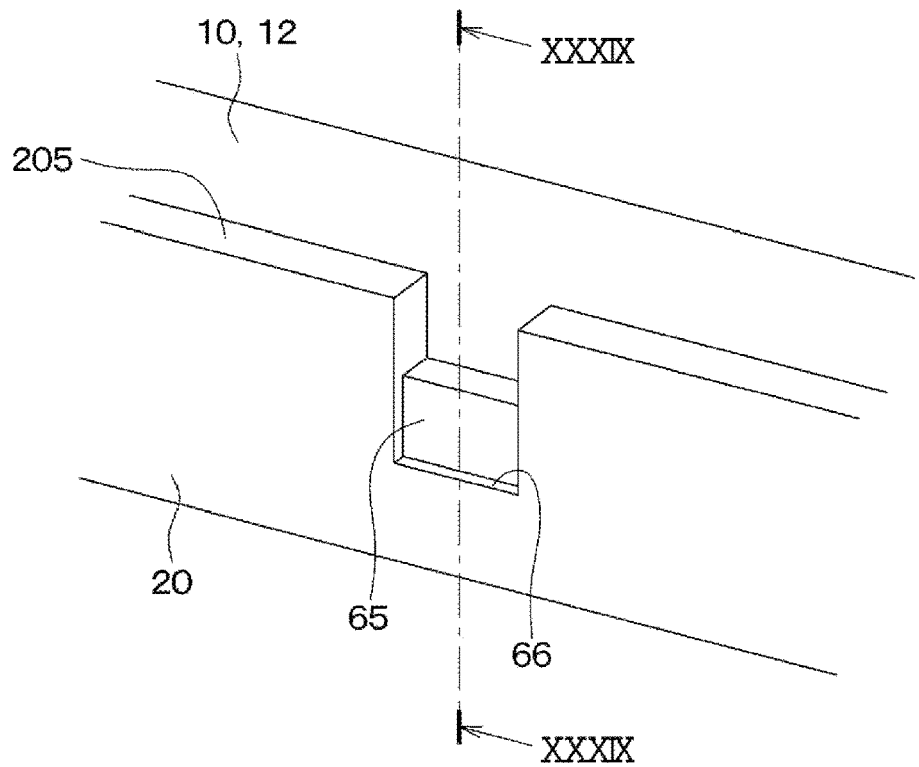
FIG. 38 is a perspective view showing a positioning structure between a first housing and a second housing in a pedal device according to a twenty-second embodiment.
Figure 39:
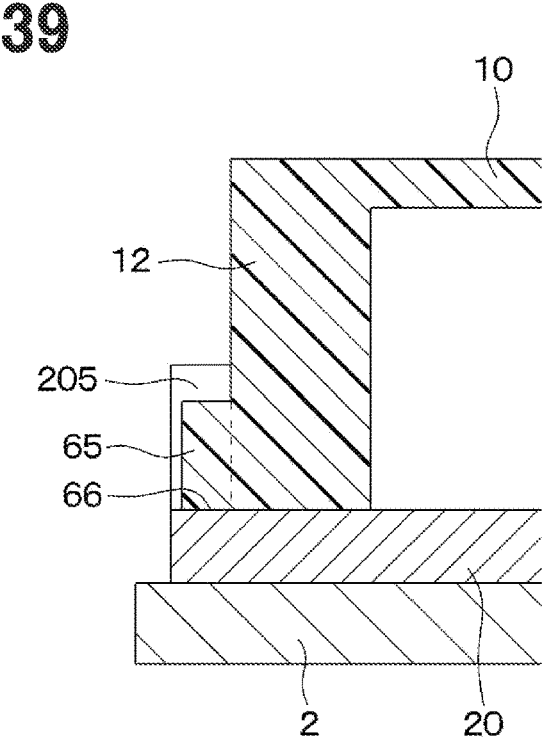
FIG. 39 is a cross-sectional view taken along a line XXXIX-XXXIX of FIG. 38.

An another example of a positioning structure 62 is described in the twenty-second embodiment. As shown in FIGS. 38 and 39, in the twenty-second embodiment, a positioning structure 62 is configured as (i) a first positioning portion 65 provided on a left side wall 12 or a right side wall 13 of a first housing 10 and (ii) a second positioning portion 66 provided on an upright wall portion 205 of a second housing 20. In the twenty-second embodiment, the first positioning portion 65 is a convex portion that protrudes outward from the left side wall 12 or the right side wall 13 of the first housing 10. On the other hand, the second positioning portion 66 is a concave portion provided on the upright wall portion 205 of the second housing 20. By the engagement of the convex portion as the first positioning portion 65 and the concave portion as the second positioning portion 66, the assembly position of the first housing 10 and the second housing 20 is accurately determinable.

The twenty-second embodiment described above can thus have the effects similar to those of the first embodiment.

Twenty-Third Embodiment

Figure 40:
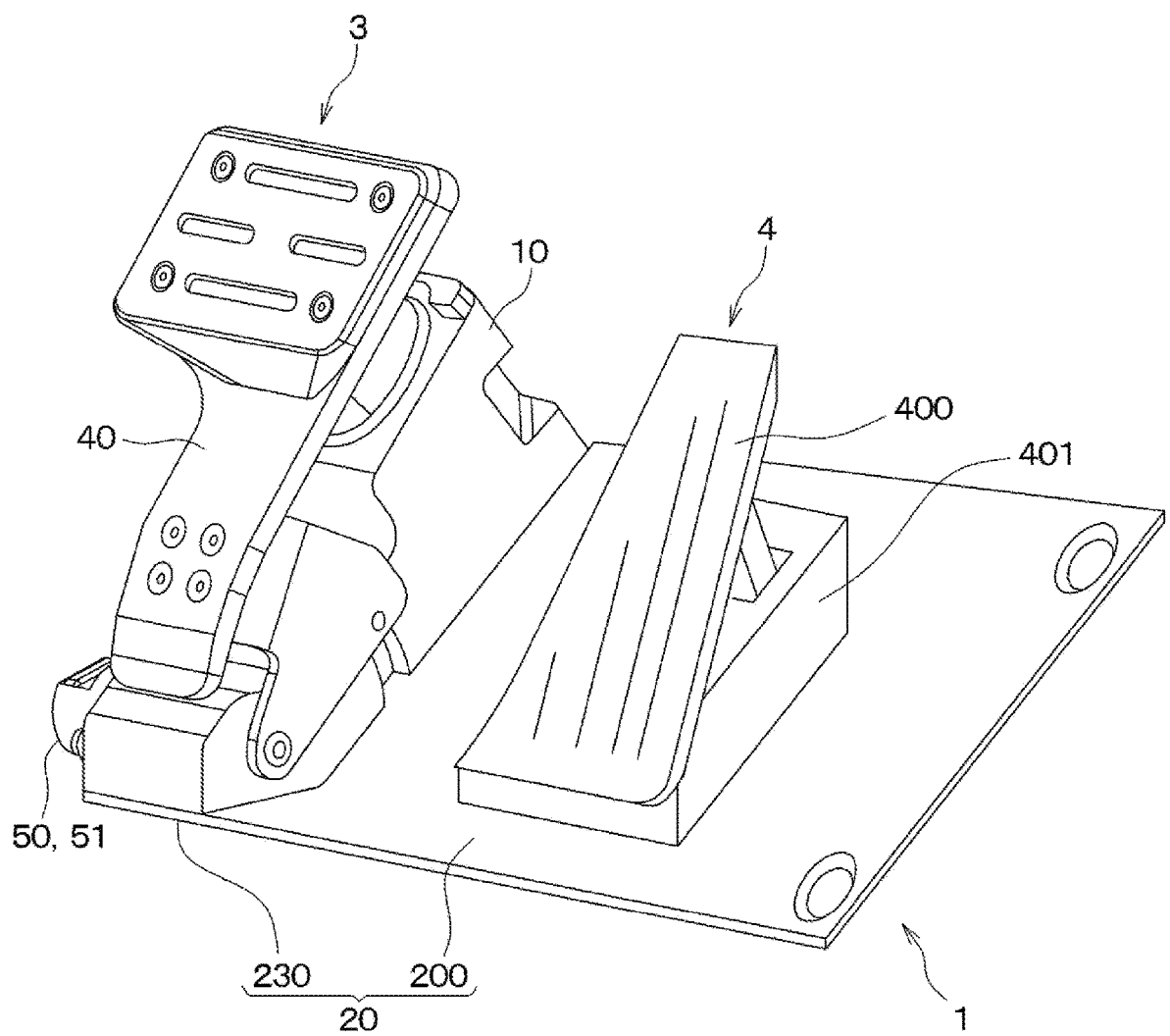
FIG. 40 is a perspective view of a pedal device according to a twenty-third embodiment.

As shown in FIG. 40, a pedal device 1 of the twenty-third embodiment is configured by integrating a brake pedal device 3 and an accelerator pedal device 4. The brake pedal device 3 and the accelerator pedal device 4 are installed in a common second housing 20. The accelerator pedal device 4 is of an accelerator-by-wire type. The accelerator-by-wire system is a system that controls the opening and closing of an electronically-controlled throttle or the driving of a driving motor by an ECU mounted on a vehicle based on an electric signal output from a sensor unit that detects the swing angle of an accelerator pedal 400. Note that the swing angle of the accelerator pedal 400 may also be designated as a stroke amount of the accelerator pedal.

The configuration of the brake pedal device 3 is substantially the same as that described in the first embodiment. However, a second housing 20 of the brake pedal device 3 has a fixing portion 200 that extends outside an outer edge of a first housing 10 of the brake pedal device 3 and supports a housing 401 of the accelerator pedal device 4. A portion 230 of the second housing 20 that supports the brake pedal device 3 and the fixed portion 200 that supports the accelerator pedal device 4 are integrally formed of a continuous material.

Also in the twenty-third embodiment, the second housing 20 is made of a member having a Young's modulus greater than that of the first housing 10 of the brake pedal device 3 as in the first embodiment, or has a member having a Young's modulus greater than that of the first housing 10 at least in part. Also in the twenty-third embodiment, the member having a Young's modulus greater than that of the first housing 10 is designated as "a rigid portion 21." The second housing 20 supports a portion of the reaction force generation mechanism 30 of the brake pedal device 3 on one side opposite to the pedal pad 40 with the rigid portion 21.

In the twenty-third embodiment described above, the second housing 20 has the fixing portion 200 that extends outside the outer edge of the first housing 10 of the brake pedal device 3 and supports the accelerator pedal device 4. According to the above, it is possible to integrate the brake pedal device 3 and the accelerator pedal device 4 into one body. Therefore, the pedal pad 40 of the brake pedal device 3 and the accelerator pedal 400 of the accelerator pedal device 4 can be assembled to the vehicle while maintaining the positional relationship between them. Specifically, the brake pedal device 3 can be assembled to the vehicle in a state, in which a positional relationship is maintained to have the accelerator pedal 400 positioned farther away from the pedal pad 40 of the brake pedal device 3. Therefore, the assemblability of the brake pedal device 3 and the accelerator pedal device 4 is improved while the safety of the vehicle is enhanced. Further, the brake pedal device 3 and the accelerator pedal device 4 is easily attachable to the vehicle as one component.

Other Embodiments (1) In each of the above-described embodiments, the brake pedal device is described as an example of the pedal device 1. The pedal device 1 is not limited to such device, and can also be an accelerator pedal device. Alternatively, a pedal device 1 can be various devices that are operated by the driver's foot.

(2) In each of the above-described embodiments, as an example of the pedal device 1, the pedal pad 40 and the master cylinder 126 are not mechanically connected. The present disclosure is not limited to such example, and the pedal device 1 may also be a device in which a pedal pad 40 and a master cylinder 126 are mechanically connected.

(3) In each of the above-described embodiments, an example of the reaction force generation mechanism 30 is described as a combination of the leaf spring 31 and a plurality of the coil springs 33 and 34, or as a single coil spring 32. The reaction force generation mechanism 30 is not limited to such example, and a reaction force generation mechanism 30 may also be made of a plurality of coil springs 33 and 34, for example, or may also be made of one or a plurality of leaf springs 31. Alternatively, pedal pad 40 and a master cylinder 126 may be mechanically connected and a reaction force against the pedaling force applied to the pedal pad 40 by the driver may be generated by the master cylinder 126.

(4) In each of the above-described embodiments, the brake-by-wire system 100 is described as a system in which the master cylinder 126 generates hydraulic pressure in the brake fluid flowing through the brake circuit 120, but the present disclosure is not limited to the above, and a brake-by-wire system 100 may also be configured to generate hydraulic pressure in the brake fluid flowing through a brake circuit 120 using a hydraulic pump, for example.

(5) In the first embodiment, the ECU 110 is configured by the first ECU 111 and the second ECU 112, as an example. The present disclosure is not limited to such example, and one ECU or more than three ECUs may be used to configure the ECU 110.

(6) In the eleventh and twelfth embodiments, the configuration in which the second housing 20 has the rigid portion 21 as part of the resin portion 28 has been described. The configuration is not limited to the above, and the second housing 20 may have a rigid portion embedded in a resin portion 28.

The present disclosure is not limited to the above-described embodiments, and can be appropriately modified. The above-described embodiments are not independent of each other, and can be appropriately combined together except when the combination is obviously impossible. Further, individual elements or features of a particular embodiment are not necessarily essential unless it is specifically stated that the elements or the features are essential in the foregoing description, or unless the elements or the features are obviously essential in principle. Further, in each of the embodiments described above, when numerical values such as the number, numerical value, quantity, range, and the like of the constituent elements of the embodiment are referred to, except for the cases where the numerical values are expressly indispensable in particular, and the cases where the numerical values are obviously limited to a specific number in principle, and the like, the present disclosure is not limited to such value or number. Further, a shape, positional relationship or the like of a configuration element, which is referred to in the embodiments described above, is not necessarily limiting the disclosure, unless it is specifically described so or obviously necessary in principle.

What is claimed is:

1. A pedal device configured to transmit an electric signal corresponding to an amount of a pedal operation by a driver to an electronic control device of a vehicle, the pedal device comprising:
  a pedal pad configured to swing about a predetermined axis when being stepped on by a driver's foot, wherein a step portion of the pedal pad to be stepped on by the driver is arranged above the axis in a vertical direction when mounted on the vehicle;
  a sensor unit configured to output a signal corresponding to a swing angle of the pedal pad;
  a reaction force generation mechanism having an elastic member configured to generate a reaction force against a driver's stepping force applied to the pedal pad;
  a first housing configured to cover the reaction force generation mechanism; and
  a second housing provided on one side of the first housing in a swing direction of the pedal pad, wherein the first housing has a largest opening on a side of the second housing, the elastic member of the reaction force generation mechanism is insertable into the largest opening in a non-bending state, and the second housing is configured to cover the largest opening.

2. The pedal device according to claim 1, wherein
a bending direction of the elastic member of the reaction force generation mechanism, an assembly direction of the first housing and the second housing, and a swing direction of the pedal pad are respectively in parallel with a virtual plane perpendicular to the predetermined axis.

3. The pedal device according to claim 1, wherein
the first housing has a bearing portion configured to rotatably support a rotation shaft provided on the predetermined axis of the pedal pad, and
the second housing is configured to support a portion of the reaction force generation mechanism opposite to the pedal pad.

4. The pedal device according to claim 1, wherein
the second housing has a bearing portion configured to rotatably support a rotation shaft provided on the predetermined axis of the pedal pad.

5. The pedal device according to claim 1, wherein
the second housing is made of a portion having a Young's modulus greater than that of the first housing or has a portion at least in part, to support a predetermined portion of the reaction force generation mechanism opposite to the pedal pad by the portion.

6. The pedal device according to claim 5, wherein
the portion is arranged at a position between the predetermined portion of the reaction force generation mechanism opposite to the pedal pad and a vehicle body.

7. The pedal device according to claim 5, wherein
the second housing has a first portion that supports the reaction force generation mechanism and a second portion fixed to the vehicle body, and the first portion and the second portion are integrally formed by using the portion.

8. The pedal device according to claim 5, wherein
the portion is made of metal.

9. The pedal device according to claim 1, wherein
the reaction force generation mechanism has a plurality of the elastic members.

10. The pedal device according to claim 1, wherein
the elastic member includes at least one leaf spring, and the leaf spring is fixed to the second housing.

11. The pedal device according to claim 1, wherein
the first housing and the second housing are fixed by a fixing member, and
the fixing member is fixed to the first housing through a hole portion provided in the second housing from a position on a vehicle body side in a state in which the pedal device is attached to the vehicle body.

12. The pedal device according to claim 1, wherein
the first housing and the second housing are fixed by snap fitting by using a locking claw, and
the locking claw of the snap fitting is arranged at a position invisible to an occupant of the vehicle when the pedal device is attached to the vehicle body.

13. The pedal device according to claim 1, wherein
one of the first housing or the second housing is provided with a hole portion,
an another one of the first housing or the second housing has a column portion protruding therefrom and passing through the hole portion,
a large-diameter portion is integrally formed of a continuous material with the column portion and is made greater than the hole portion, and
the first housing and the second housing are caulked and fixed by the hole portion, the column portion and the larger-diameter portion.

14. The pedal device according to claim 1, wherein
an assembly position of the first housing and the second housing is determined by a positioning structure which is made of an engagement of (i) a first positioning portion provided at the first housing and (ii) a second positioning portion provided at the second housing.

15. The pedal device according to claim 1, wherein
the pedal device is one of an accelerator pedal device or a brake pedal device of the vehicle, and
the second housing has a fixing portion that extends to an outside than an outer edge of the first housing to support an another one of the accelerator pedal device or the brake pedal device.

16. The pedal device according to claim 1, wherein
the pedal device is a brake pedal device used in a brake-by-wire system in which a brake circuit generates hydraulic pressure required for braking the vehicle by drive control of the electronic control device based on an output signal of the sensor unit.

\* \* \* \* \*